(12) United States Patent
Hardin et al.

(10) Patent No.: US 10,831,256 B2
(45) Date of Patent: Nov. 10, 2020

(54) FACILITATING POWER CONSERVATION FOR DEVICES BASED ON LIKELIHOOD OF POWER USAGE LEVEL

(71) Applicant: AT&T Mobility II LLC, Atlanta, GA (US)

(72) Inventors: Stephen Thomas Hardin, Suwanee, GA (US); Erie Lai Har Lau, Redmond, WA (US); Brian Greaves, Atlanta, GA (US); Robert Osterwise, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 133 days.

(21) Appl. No.: 16/163,279

(22) Filed: Oct. 17, 2018

(65) Prior Publication Data
US 2019/0113964 A1    Apr. 18, 2019

Related U.S. Application Data

(63) Continuation of application No. 15/055,775, filed on Feb. 29, 2016, now Pat. No. 10,139,892.

(51) Int. Cl.
*G06F 1/00* (2006.01)
*G06F 1/3287* (2019.01)
(Continued)

(52) U.S. Cl.
CPC .......... *G06F 1/3287* (2013.01); *G01C 21/00* (2013.01); *G06F 1/3206* (2013.01);
(Continued)

(58) Field of Classification Search
CPC .... G06F 1/3287; G06F 1/3206; G06F 1/3296; G06F 1/3212; G01C 21/00; Y02D 10/171; Y02D 10/172; Y02D 10/174
(Continued)

(56) References Cited

U.S. PATENT DOCUMENTS

| 6,236,674 B1 | 5/2001 | Morelli et al. |
| 6,332,086 B2 | 12/2001 | Avis |

(Continued)

FOREIGN PATENT DOCUMENTS

| EP | 2178062 A2 | 4/2010 |
| EP | 2937762 A1 | 10/2015 |

OTHER PUBLICATIONS

Non-Final Office Action received for U.S. Appl. No. 15/055,775 dated Aug. 9, 2017, 23 pages.

(Continued)

*Primary Examiner* — Volvick Derose
(74) *Attorney, Agent, or Firm* — Amin, Turocy & Watson, LLP

(57) ABSTRACT

Power conservation for devices is facilitated based on likelihood of power usage level. An example method can comprise determining, by a first device comprising a processor, that a second device is within a defined proximity of a third device, wherein the third device is determined to be operating in a mode according to a first power consumption operation that satisfies a defined condition, and wherein the operating in the mode according to the first power consumption operation is based on the third device being located at a defined location. The method can also comprise facilitating, by the first device, modification of the mode of the third device based on a determination of a likelihood of usage of a second power consumption operation by the third device. In various embodiments, the third device is configured to operate according to the power save mode or the extended discontinuous reception mode.

19 Claims, 12 Drawing Sheets

(51) Int. Cl.
*G06F 1/3296* (2019.01)
*G06F 1/3212* (2019.01)
*G01C 21/00* (2006.01)
*G06F 1/3206* (2019.01)
*G06F 1/3203* (2019.01)

(52) U.S. Cl.
CPC .......... *G06F 1/3212* (2013.01); *G06F 1/3296* (2013.01); *G06F 1/3203* (2013.01); *Y02D 10/00* (2018.01)

(58) Field of Classification Search
USPC ........................................................ 713/323
See application file for complete search history.

(56) References Cited

U.S. PATENT DOCUMENTS

| | | | |
|---|---|---|---|
| 7,372,818 B2 | 5/2008 | Fraser et al. | |
| 7,689,325 B2 | 3/2010 | Farrow | |
| 7,768,384 B2 | 8/2010 | Yamaguchi | |
| 8,000,842 B2 | 8/2011 | Yi et al. | |
| 8,103,291 B2 | 1/2012 | Rippon et al. | |
| 8,160,656 B2 | 4/2012 | Van Bosch et al. | |
| 8,271,057 B2 | 9/2012 | Levine et al. | |
| 8,452,353 B2 | 5/2013 | Crawford | |
| 8,467,837 B2 | 6/2013 | Matson et al. | |
| 8,653,956 B2 | 2/2014 | Berkobin et al. | |
| 8,762,756 B1 | 6/2014 | Moy | |
| 8,965,464 B2 | 2/2015 | Chawla | |
| 9,100,776 B2 | 8/2015 | Basir | |
| 9,121,711 B2 | 9/2015 | Tidd et al. | |
| 9,167,381 B2 | 10/2015 | McDonald et al. | |
| 9,179,410 B2 | 11/2015 | Frye | |
| 9,344,990 B1* | 5/2016 | Bali | H04W 64/006 |
| 2002/0042280 A1 | 4/2002 | Allen, Jr. | |
| 2006/0084442 A1* | 4/2006 | Kotzin | H04W 84/08 |
| | | | 455/445 |
| 2008/0032705 A1* | 2/2008 | Patel | H04L 65/104 |
| | | | 455/456.1 |
| 2009/0163226 A1 | 6/2009 | Karkaria et al. | |
| 2010/0023204 A1 | 1/2010 | Basir et al. | |
| 2010/0073169 A1* | 3/2010 | Needham | G08B 21/0469 |
| | | | 340/573.1 |
| 2011/0018346 A1 | 1/2011 | Dixon | |
| 2011/0109480 A1* | 5/2011 | Huijnen | G08G 1/141 |
| | | | 340/932.2 |
| 2011/0159884 A1* | 6/2011 | Chawla | H04W 52/0254 |
| | | | 455/456.1 |
| 2012/0065802 A1* | 3/2012 | Seeber | H02J 13/0075 |
| | | | 700/295 |
| 2013/0257604 A1* | 10/2013 | Mirle | B60R 16/02 |
| | | | 340/425.5 |
| 2013/0267253 A1 | 10/2013 | Case et al. | |
| 2014/0187264 A1* | 7/2014 | Min | H04W 48/16 |
| | | | 455/456.2 |
| 2014/0274223 A1 | 9/2014 | Kleve et al. | |
| 2014/0370909 A1 | 12/2014 | Natucci, Jr. et al. | |
| 2014/0372774 A1* | 12/2014 | Li | G06F 1/26 |
| | | | 713/300 |
| 2015/0024772 A1 | 1/2015 | Das et al. | |
| 2015/0087361 A1 | 3/2015 | Kolaks et al. | |
| 2015/0156725 A1 | 6/2015 | Basir et al. | |
| 2015/0234444 A1* | 8/2015 | Aasheim | G06F 1/329 |
| | | | 713/320 |
| 2016/0081119 A1* | 3/2016 | Yang | H04W 24/08 |
| | | | 370/252 |
| 2016/0291671 A1* | 10/2016 | Rider | G06F 1/3206 |
| 2017/0075411 A1* | 3/2017 | Goldsmith | H04W 52/028 |

OTHER PUBLICATIONS

Final Office Action received for U.S. Appl. No. 15/055,775 dated Mar. 9, 2018, 11 pages.
"Understanding Sleep Mode", VisableTesla, visabletesla.com, 6113/2014. https://web.archive.org/web/20140613102740/http://visibletesla.com/Documentation/pages/SieepMode.html. Retrieved on Dec. 10, 2015, 3 pages.
"Sleep Mode Settings," GPSintegrated, gpsintegrated.com, Jun. 15, 2012. https://web.archive.org/web/20120615091103/http://gpsintegrated.com/products/mobilephonesmartphonetracking/gps-celelphone-tracking-manual/sleep-mode-settings/. Retrieved on Dec. 10, 2015, 28 pages.
Lamance et al., "Assisted GPS: A Low-Infrastructure Approach," GPS World, gpsworld.com, Mar. 2002, pp. 46-51. http://www.gpsworld.com/wp-content/uploads/2012/09/gpsworld_Innovation_0302.pdf. Retrieved on Dec. 10, 2015, 6 pages.

* cited by examiner

FACILITATING POWER CONSERVATION FOR DEVICES BASED ON LIKELIHOOD OF POWER USAGE LEVEL

RELATED APPLICATION

The subject patent application is a continuation of, and claims priority to, U.S. patent application Ser. No. 15/055,775, filed Feb. 29, 2016, and entitled "FACILITATING POWER CONSERVATION FOR DEVICES BASED ON LIKELIHOOD OF POWER USAGE LEVEL," the entirety of which application is hereby incorporated by reference herein.

TECHNICAL FIELD

The subject disclosure relates generally to devices, and, for example, to facilitating power conservation for devices based on likelihood of power usage level.

BACKGROUND

As technological advances continue to grow, Internet of Things (IoT) devices are being targeted for many uses. These devices have wide-ranging operating capability and can perform differently based on consumer demand and/or the current state of the devices. For example, the operating capability and/or consumer demand can vary depending on whether the device is stationary or mobile, attended or unattended, regularly accessible or inaccessible and/or the frequency of use of the device.

Automobile telematics control unit (TCU) devices are IoT devices that typically have a unique combination of one or more of the above states concurrently or within the course of a single day since automobiles can be stationary, mobile, attended or unattended, and the level of use can vary significantly. As such, at a first time, the TCU device may operate in a state having sustained high power levels and high throughput and, at a second time, may operate at reduced power levels. Accordingly, facilitating power conservation for devices based on likelihood of power usage level is desired.

DETAILED DESCRIPTION

Figure 1:
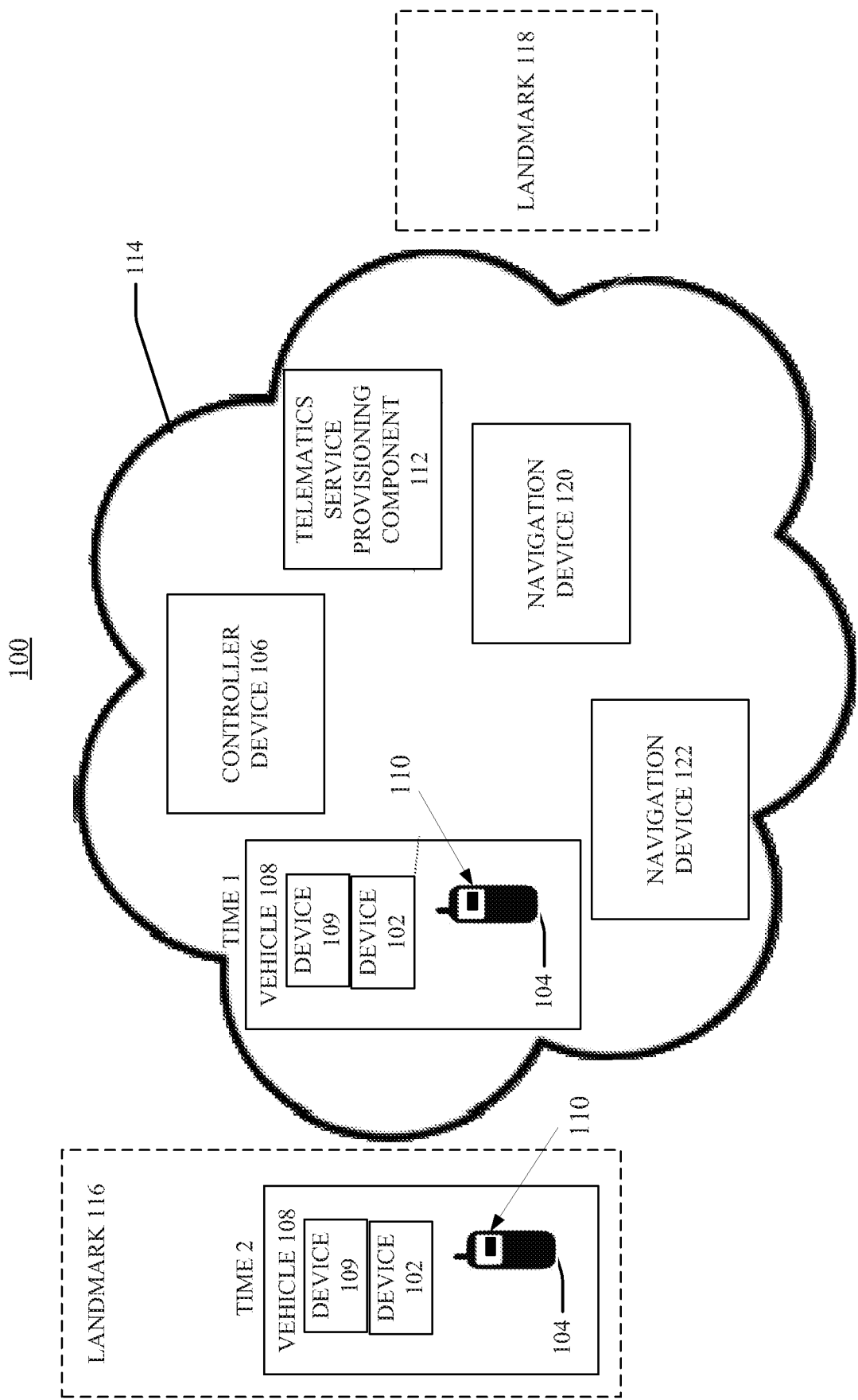
FIG. 1 illustrates an example block diagram of a system that facilitates power conservation for devices based on likelihood of power usage level in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the terms "femto" and "femto cell" are used interchangeably, and the terms "macro" and "macro cell" are used interchangeably.

As technological advances continue to grow, IoT devices are being targeted for many uses. These devices have wide-ranging operating capability and can perform differently based on consumer demand and/or the current state of the devices. For example, the operating capability and/or consumer demand can vary depending on whether the device is stationary or mobile, attended or unattended, regularly accessible or inaccessible and/or the frequency of use of the device.

Automobile TCU devices are IoT devices that typically have a unique combination of one or more of the above states concurrently or within the course of a single day since automobiles can be stationary, mobile, attended or unattended, and the level of use can vary significantly. As such, at a first time, the TCU device may operate in a state having sustained high power levels and high throughput and, at a second time, may operate at reduced power levels.

Various functions performed by connected car devices that comprise TCU devices, for example, can drain the vehicle battery when the vehicle is parked or otherwise turned off and the device utilizes the vehicle battery for power. Accordingly, systems, apparatuses and/or methods facilitating power conservation for devices based on likelihood of power usage level are desired.

In one embodiment, a method of facilitating power conservation for devices based on likelihood of power usage level is provided. The method can comprise determining, by a first device comprising a processor, that a second device is within a defined proximity of a third device, wherein the third device is determined to be operating in a mode according to a first power consumption operation that satisfies a defined condition, and wherein the operating in the mode according to the first power consumption operation is based on the third device being located at a defined location. The method can also comprise facilitating, by the first device, modification of the mode of the third device based on a determination of a likelihood of usage of a second power consumption operation by the third device.

In another embodiment, another method is provided. The method can comprise: determining, by a device comprising a processor, that the device is located at a defined location; and determining, that the defined location is associated with a likelihood of a maximum power usage level of a radio of the device to be below a defined threshold. In some embodiments, the method also comprises modifying, by the device, a mode of the power consumption of the radio of the device from a first power consumption mode to a second power consumption mode based on the determining that the device is located at the location and based on the determining that the defined location is associated with a likelihood of a maximum power usage level of the radio of the device to be below the defined threshold.

In yet another embodiment, a machine-readable storage medium is provided. The machine-readable storage medium can comprise executable instructions that, when executed by a processor, facilitate performance of operations. The operations can comprise: determining that a first device is within a defined proximity of a second device, wherein the second device is determined to be operating in a mode according to a first power consumption operation that satisfies a defined condition, and wherein the operating in the mode according to the first power consumption operation is based on the second device being located at a defined location; and facilitating adjustment of the mode of the second device based on a determination of a likelihood of usage of a second power consumption operation by the second device.

In order to reduce the amount of the power consumption, power save mode and/or enhanced discontinuous reception (eDRX) can be employed. For example, the device that will have different levels of power consumption can be configured to include power save mode and/or eDRX functionality. The PSM can enable the device to save power by moving to a new power savings state (e.g., from idle) in which one or more (or, in some embodiments, all) AS functionalities cease operation while staying registered with the core network. The device wakes up (going back to the idle state) when the device has uplink data pending or when the device is scheduled to perform a periodic tracking area update. With regard to eDRX, the eDRX functionality can extend the DRX cycle times up to 3 hours (idle mode) and 10 seconds (connected mode).

One or more of the embodiments described herein can conserve power and reduce the likelihood of vehicle battery drain while maintaining an acceptable level of responsiveness of one or more devices. Accordingly, a vehicle battery (or, in other embodiments, any number of different types of batteries that power one or more devices) can have battery life extended via one or more embodiments described herein. Further, in one or more embodiments, processing efficiencies can be gained for systems with which a device is communicating over a network since the device can be placed in a lower power mode associated with a longer time period between which the device awakens to determine whether there are any commands for the device to which the device should respond. However, by contrast, when the likelihood is such that the device is likely to be used at a full or higher operational power level within a defined amount of time, to preserve the ability to respond to consumer demands on the device, the device can operate at a higher power operation level, which can result in less time between awakening to determine whether are commands to which the device should respond.

Figure 2:
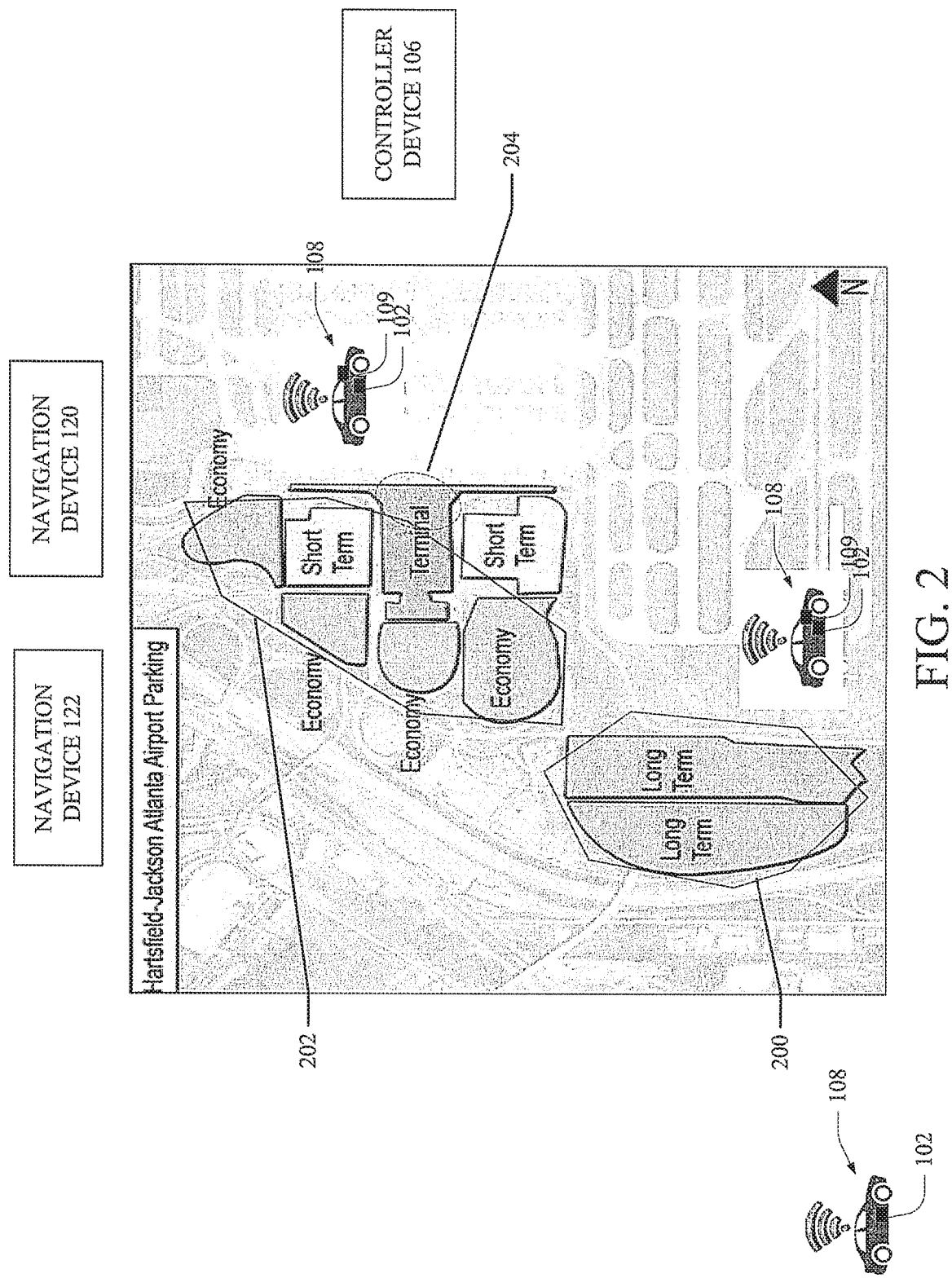
FIG. 2 illustrates an example schematic diagram comprising airport venues that can be identified to facilitate power conservation for devices based on likelihood of power usage level in accordance with one or more embodiments described herein.

FIG. 1 illustrates an example block diagram of a system that facilitates power conservation for devices based on likelihood of power usage level in accordance with one or more embodiments described herein. FIG. 2 illustrates an example schematic diagram comprising airport venues that can be identified to facilitate power conservation for devices based on likelihood of power usage level in accordance with one or more embodiments described herein. Repetitive description of like elements employed in other embodiments described herein is omitted for sake of brevity.

The system 100 can facilitate power conservation for devices based on determined impending or forthcoming power usage level of the device. For example, as shown in FIG. 1, system 100 can facilitate power conservation for device 102 or another device (e.g., device 109) of vehicle 108 based on a determined impending or forthcoming power usage level of the device 102, the vehicle 108 and/or the device 109.

System 100 can comprise one or more of the vehicle 108 (which can comprise or be communicatively coupled to the device 102 and/or device 109), a controller device 106 and, in embodiments in which the device 109 is a TCU device, system 100 can also comprise a telematics service provisioning component 112 that can provide one or more telematics services to device 109. As shown, system 100 can also comprise one or more of navigation devices 120, 122. In some embodiments, the system 100 can also comprise a mobile device 104 that can be associated with a user entity associated with the vehicle 108. In some embodiments, as shown, the mobile device 104 can comprise the mobile device—controller device application component 110. In various embodiments, one or more of the controller device 106, device 102, device 109, mobile device 104, mobile device—controller device application component 110, navigation devices 120, 122 and/or telematics service provisioning component 112 can be electrically and/or communicatively coupled to one another to perform one or more functions of the system 100. In various embodiments, the network 114 can be the Internet or any number of different wide area networks that can facilitate communication with one or more of navigation devices 120, 122 and/or controller device 106 located remote from the vehicle 108, device 102 and/or device 109.

In various embodiments, device 102 can be or comprise hardware and/or software configured to determine or receive location information regarding a location of the vehicle 108, device 102 and/or device 109. For example, in some embodiments, the device 102 can determine and/or receive location information from or based on information or processing of one or more of navigation devices 120, 122, which can communicate with one or more satellites (not shown) to determine location information for vehicle 108, device 102 and/or device 109.

The device 102, vehicle 108 and/or device 109 can operate at a first power level or at a second power level at different times. As such, one or more embodiments described herein can facilitate power conservation for the device 102, vehicle 108 and/or device 109 by causing the operational mode of device 102, vehicle 108 and/or device 109 to change such that the power level usage changes. Accordingly, the battery to which the device 102, vehicle 108 and/or device 109 is connected can be preserved in some embodiments.

The level of power usage can be changed based on changing the mode in which the device 102, vehicle 108 and/or device 109 operates. The mode can dictate how often the device 102, vehicle 108 and/or device 109 awakens to receive and process commands and therefore can result in a higher level of power usage when the interval between subsequent awake periods decreases and can result in a lower level of power usage when the interval between subsequent awake periods increases. The time period between subsequent awake periods, however, can dictate the level of responsiveness of the device 102, vehicle 108 and/or device 109 to any user commands/demands for the device 102, vehicle 108 and/or device 109 since the command/demand cannot be processed until the device 102, vehicle 108 and/or device 109 awakens.

By way of example, but not limitation, a device (e.g., device 102, vehicle 108 and/or device 109) can utilize features comprising eDRX mode defined in the 3GPP Release 12 to modify the length of the time period between subsequent awake periods. Extending the amount of time between subsequent awake periods can result in longevity of the battery of the device 102, vehicle 108 and/or device 109 (or longevity of any battery that the device 102, vehicle 108 and/or device 109 is accessing). In one embodiment, for example, the eDRX functionality can extend the DRX cycle times up to 3 hours (idle mode) and 10 seconds (connected mode). As such the device 102, vehicle 108 and/or device 109 can function such that there is 10 seconds of time during which the device 102, vehicle 108 and/or device 109 is connected to the core network, controller device 106 or the like and the device 102, vehicle 108 and/or device 109 can have 3 hours during which the device 102, vehicle 108 and/or device 109 is in idle mode. As such, use of the eDRX by the device 102, vehicle 108 and/or device 109 can provide longer battery savings.

By way of another example, but not limitation, a device can utilize power save mode (PSM). In some embodiments, the PSM can be or include one or more features of the PSM from 3GPP Release 12. In other embodiments, any number of other different functions of PSM can be as described herein notwithstanding the functionality may or may not be that described in 3GPP Release 12.

In some embodiments, PSM can enable the device to have different levels of power consumption. The PSM can enable the device 102, vehicle 108 and/or device 109 to save power by moving to a new power savings state (e.g., from idle) in which one or more (or, in some embodiments, all) functionalities of a particular type (e.g., AS functionalities) cease operation while staying registered with the core network, controller device 106 or the like. The device 102, vehicle 108 and/or device 109 can wake up (going back to the idle state) when or after the device 102, vehicle 108 and/or device 109 has uplink data pending or when or after the device 102, vehicle 108 and/or device 109 is scheduled to perform a periodic tracking area update (TAU). As such, use of the PSM by the device 102, vehicle 108 and/or device 109 can provide longer battery savings.

In some embodiments, PSM does not allow frequent reachability due to typical TAU periodicity of 54 minutes. Some results show that PSM is efficient when reachability delays of greater than 30 minutes for mobile terminated (MT) data are needed.

In some embodiments, during PSM the baseband (BB) and radio frequency channels (RF) can be switched off completely and the device 102, vehicle 108 and/or device 109 is not available for paging. The device 102, vehicle 108 and/or device 109 can at any time move out of the PSM because of uplink data to transmit or because of TAU scheduling. This operation can be similar to the power-off state, but the device 102, vehicle 108 and/or device 109 can remain registered to the network and there is no need to re-attach/re-establish packet data network (PDN) connectivity. The fact that there is no need to re-attach/re-establish PDN connectivity can be particularly advantageous because such reduces the amount of awake time and reduces the amount of power used sending new uplink messages at every wake interval. The device 102, vehicle 108 and/or device 109 can perform TAU/routing area update (RAU) periodically by waking up during PSM Some timers are active during PSM unlike in the power-off state. If the device 102, vehicle 108 and/or device 109 is in PSM, the network typically has to wait for a mobile originated (MO) event (e.g., data transfer or signalling) to be able to reach the device 102, vehicle 108 and/or device 109 for any MT service. Accordingly, for example, if we need to have the customer reach the vehicle 108 or device 109 to have an unlock or remote start performed, we have to keep this interval in consideration or determine a way to trigger the vehicle 108 or device 109 to come out of this mode for example by knowing our travel itinerary. In various embodiments, PSM and eDRX can achieve under certain conditions similar activity percentages.

In some embodiments, the battery life can be extended by months as opposed to only extending battery life by a few weeks as is the case in many battery implementations today.

By way of example, but not limitation, in one or more embodiments described herein, after the device 102, vehicle 108 and/or device 109 goes into a sleep mode or a lower power level mode, the time period at which the device 102, vehicle 108 and/or device 109 awakens to check for commands can increase and therefore there can be greater latency for a user response by the device 102, vehicle 108 and/or device 109. For example, if a user initiates a command to unlock a vehicle door, the vehicle 108 can respond quickly (e.g., higher power level mode, faster responsiveness associated with awakening more often to check for commands). However, if the vehicle 108 is in the lower power level mode, the vehicle 108 can awaken (e.g., process control unit (PCU) of the vehicle 108 can awaken) and/or check for commands less frequently and so as to conserve battery life; however, responsiveness of the vehicle 108 decreases. In some embodiments, one or more embodiments described herein can cause a device 102, device 109 and/or vehicle 108 to move into an operational state that is associated with power usage levels lower than power usage levels for an idle state, which continues to drain substantial current thereby not providing good power savings.

In these embodiments, one or more of the navigation devices 120, 122 can determine geographical location information that can identify one or more boundaries (or, in some embodiments, a polygon defining a perimeter) of a location. As such, polygons can be determined coinciding with one or more different locations having a defined area. In some embodiments, one or more of the navigation devices 120, 122 can determine location accuracy to within a defined distance (e.g., 25-30 meters) from the device 102.

The device 102 can also be configured to determine the location or the proximity of the device 102, device 109 and/or vehicle 108 to one or more of landmarks 116, 118. Landmarks 116, 118 can be any number of different areas or structures at which device 102, device 109 and/or vehicle 108 can be physically located in some embodiments. Landmarks 116, 118 can be or comprise, for example, airport parking lots, airport terminals, stadium venues, concert halls, parking garages, buildings, houses or any number of other areas or physical structures for which the location information can be detected by the navigation devices 120, 122.

In some embodiments, the device 102 can determine and/or receive information from one or more of navigation devices 120, 122 regarding the location of device 102, device 109 and/or vehicle 108 and/or the location of one or more landmarks 116, 118. In some embodiments, the device 102 can determine and/or receive information regarding whether the device 102, device 109 and/or vehicle 108 is located within a boundary of one or more of landmarks 116, 118, the proximity to one or more of landmarks 116, 118 or the like.

In some embodiments, the device 102 is co-located within or on the vehicle 108 and device 109 such that a location of device 102 is indicative of a location of the vehicle 108 and device 109. Devices 102, 109 or vehicle 108 can be or comprise any number of different types of devices that can operate at different power levels. For example, one or more of devices 102, 109 or vehicle 108 can operate in a first power mode at a first power level at a first time and can operate at a second power mode at a second power level at a second time. For example, while vehicle 108 is parked and located at a first defined location, one or more of vehicle 108, device 102 or device 109 can operate at a first (e.g., lower) power level based on a likelihood that the vehicle 108, device 102 and/or device 109 will need a lower level of operation to meet the commands/demands of a user likely to use the device 102, device 109 and/or vehicle 108. Similarly, as another example, the vehicle 108, device 102 and/or device 109 can operate at a second (e.g., higher) power level while the vehicle 108 is in transit and/or located at a second defined location and/or while a user is actively using the device 102, device 109 and/or vehicle 108. In some embodiments, the device 102 and/or device 109 can detect that the device 102 or device 109 is or has been stationary for a defined amount of time and deduce that the vehicle 108 is parked.

In some embodiments, the power level at which the vehicle 108, device 102 and/or device 109 operates can be based on: a determined impending or forthcoming level of power usage based on the location of the vehicle 108, device 102 and/or device; determined information regarding an event a user entity associated with the device 102, device 109, mobile device 104 and/or vehicle 108 (e.g., that the user entity is likely to attend or be attending or be likely to attend in the near future (e.g., within the next 15 or 20 minutes after the determination is made)).

In some embodiments, the impending or forthcoming power level usage can be determined by the device 102. In other embodiments, the power level can be determined by the controller device 106 and communicated to the device 102, the vehicle 108 and/or the device 109. In some embodiments, the power level can be determined by the controller device 106 and communicated to the device 102, device 109 and/or vehicle 108 via the mobile device 104. In some embodiments, the power level can be determined by the mobile device 104.

Accordingly, in one or more of various different embodiments, the vehicle 108, device 109 and/or device 102 can be configured to operate according to different modes. For example, a first mode can coincide with a first state having sustained power and operating in a high throughput mode while a second mode can coincide with a second state that is in a sleep mode, reduced power level mode and/or minimal current drain and minimal throughput mode. One or more of the vehicle 108, device 102 and/or device 109 can be configured to flexibly operate in the optimal high end modes as well as the lowest power modes and can know or determine when to activate one of two different modes (or can receive information or signals controlling the vehicle 108, device 102 and/or device 109 to activate one of two different modes). While the embodiments described herein indicate two different modes/power levels, in various embodiments, any number of different modes/power levels can be activated by vehicle 108, device 102 and/or device 109 based on the particular design configuration of the vehicle 108, device 102 and/or device 109. All such embodiments are envisaged.

Controller device 106 can transmit and/or receive information regarding a power level of the devices 102, 109 based on information regarding the location of the mobile device 104, the devices 102, 109, the vehicle 108 and/or the landmarks 114, 116. For example, in embodiments in which the controller device 106 determines and/or receives information indicating the device 102 is located within landmark 114 and landmark 114 is an area that indicates the user of the vehicle 108, device 102 and/or device 109 is not likely to access the vehicle 108, device 102 and/or device 109 for a defined period of time and/or that the user is likely to need only a low level of power usage for an extended period of time (e.g., one day, one week, two weeks), the controller device 106 can generate information to cause the vehicle 108, device 102 and/or device 109 to move into a low power mode. By contrast, in embodiments in which the controller device 106 determines and/or receives information indicating the device 102 is located within landmark 114 and landmark 114 is an area that indicates the user of the vehicle 108, device 102 and/or device 109 is likely to access the vehicle 108, device 102 and/or device 109 within a defined period of time and/or that the user is likely to need a higher or full power level of power usage within a defined period of time (e.g., within the same day), the controller device 106 can generate information to cause the vehicle 108, device 102 and/or device 109 to move into a higher power mode or to operate in a full power mode.

The navigation devices 120, 122 can be configured to determine location information for one or more of the mobile device 104, the devices 102, 109 and/or the landmarks 114, 116. By way of example, but not limitation, navigation device 120 can be a Global Positioning System (GPS) component and navigation device 122 can be another location system component (e.g., Iridium location system component), either of which can determine the geographical coordinates and/or location information for one or more of the devices 102, 109, vehicle 108, mobile device 104 and/or landmarks 114, 116. In some embodiments, the navigation devices 120, 122 can operate concurrently or during mutually exclusive time periods. The navigation devices 120, 122 can determine or estimate one or more boundaries or perimeters of landmarks 114, 116 and determine one or more of location information of device 102, device 109, mobile device 104 and/or vehicle 108.

The telematics service provisioning component 112 can include hardware and/or software and can be configured to process and/or generate information that can facilitate telematics services for the vehicle 108 and/or for the device 109. By way of example, but not limitation, telematics service provisioning component 112 can cooperate with one or more of the navigation devices 120, 122 to provide location information and/or mapping or other navigation capabilities to vehicle 108 and/or device 109. In some embodiments, the telematics service provisioning component 112 can communicate with device 109 in embodiments in which the device 109 is a TCU device. In this embodiment, the device 109 can comprise a navigation mapping or information component, a sensor, wireless communication device, a communications radio configured to transmit and/or receive wireless communications/commands and/or facilitate control of one or more operations of one or more other devices, a multimedia device or any other of a number of different devices. For example, the device 109 can be a communications radio that can receive information controlling the device 109, device 102 and/or another device (e.g., a door lock/door unlock sensor of a vehicle 108 or other device) to perform an action. In this regard, device 109 can be an IoT device and/or facilitate control of an IoT device.

While the embodiments describe the devices 102, 109 and/or vehicle 108 receiving information to cause the components to move into different operational modes associated with reduction or increase of power level usage, in some embodiments, the vehicle 108, device 102 and/or device 109 can perform self recognition of location and/or associated events at a particular location to self-trigger reduced power level mode and/or to self-trigger activation of increased power level mode for the devices 102, 109 and/or vehicle 108.

While the embodiment in FIG. 1 shows devices 102, 109 in vehicle 108, which is an automobile, in various other embodiments, one or more of devices 102, 109 can be associated with, comprised within or co-located with any of a number of other vehicles (e.g., marine vehicles, comprising boats, submarines, yachts; farm vehicles, comprising tractors) and the like. One or more embodiments can relate to boats and can be useful for power conservation, for example, for boats that are only operated intermittently while being parked at a marina for weeks or months at a time in between full power operation. In other embodiments, one or more of devices 102, 109 can be associated with, comprised within or co-located with any of a number of other networked structures (e.g., networked home structures as described below with reference to FIG. 4).

All embodiments are envisaged herein. Various examples of use cases of facilitating power conservation for devices based on determined impending or forthcoming power usage level will now be described with reference to FIGS. 1, 2, 3, 4 and 5.

As shown in FIG. 1, vehicle 108 is located outside of the boundaries of landmarks 116, 118 during time 1. For example, device 102 can receive information indicative of the location of device 102 being outside of the boundaries of landmarks 116, 118 and/or receive information notification when the device 102 is within a defined proximity and/or is located within the boundaries of landmarks 116, 118 or any other landmarks of interest. By way of example, but not limitation, the location of the device 102, device 109 and/or vehicle 108 can be tracked and/or determined by the navigation device 120 or navigation device 122. In some embodiments, the location of the device 102, device 109 and/or vehicle 108 relative to the location of the landmarks 116, 118 can be determined.

As shown, at time 2, the device 102, device 109 and/or vehicle 108 can receive information (e.g., textual, map-based or otherwise) indicating the device 102, device 109 and/or vehicle 108 is at least partially in the landmark 116. In some embodiments, one or more of the navigation devices 120, 122 can track and determine that the mobile device 104 (or mobile device—controller device application component 110) is located within the boundary of the landmark 116. Based on such information regarding the device 102, device 109, mobile device 104 and/or mobile device—controller device application component 110 and/or vehicle 108 being located in the landmark 116 boundaries, the device 102, device 109 and/or mobile device 104 can determine that the likelihood that the power level usage of the vehicle 108 or device 109 can be reduced (e.g., relative to the level of power usage of the vehicle 108 and/or device 109 prior to vehicle 108 entry into the landmark 116 or prior to the vehicle 108 parking within the landmark 116) and/or whether a higher sustained power level of the vehicle 108 or device 109 can be reduced to a lower power state.

For example, with reference to FIGS. 1 and 2, if a determination is made and/or information is received that the device 102, device 109 and/or vehicle 108 is located in long-term airport parking (e.g., located within polygon 200 of FIG. 2), the vehicle 108, device 102 and/or device 109 can be controlled (or can control itself to) move to a lower power mode since the device 102, device 109 and/or vehicle 108 has determined or has received information (e.g., from controller device 106 or one or more navigation devices 120, 122) that results in a determination (by device 102, device 109 and/or vehicle 108 and/or by controller device 106) that the user of the device 102, device 109 and/or vehicle 108 will be leaving the vehicle 108 and/or otherwise not interacting with the device 102, device 109 and/or vehicle 108 for an extended period of time. For example, if the landmark 116 is an airport long-term parking lot structure, a determination can be made that a user of device 102, device 109 and/or vehicle 108 will be leaving the vehicle 108 and/or otherwise not interacting with the device 102, device 109 and/or vehicle 108 for an extended period of time because the user is likely going to catch a flight based on having parked in the long-term airport parking lot (which can be identified based on boundaries indicated by polygon 200).

As such, the type of a venue and implications for impending or forthcoming power level usage can be determined and/or predicted based on associated activity for the particular venue. In some embodiments, the activity can be whether or not a user is likely to use device 102, device 109 and/or vehicle 108 within a defined amount of time.

The particular level to which the power is reduced or increased or at which the power level will be maintained can be based on any number of factors comprising the available power levels of the vehicle 108 and/or the design of the device 102 or device 109, the amount of time that the power level will be reduced, increased and/or maintained or the like. For example, if there is a determination made that the device 109 or device 102 or vehicle 108 is located in the long-term parking, the power of the device 102, device 109 and/or vehicle 108 can be reduced to the lowest possible power level (or, in some embodiments, the lowest possible power level without going into the sleep mode). By contrast, if there is a determination made that the device 102, vehicle 108 or the device 109 is in the short-term airport parking venue (which can be identified by polygon 202) the device 109 and/or vehicle 108 can be controlled to be a power level that is greater than the power level for the long-term parking scenario and/or the power level can be maintained at the same level as when the vehicle 108, device 102 and/or device 108 was fully operational (e.g., vehicle 108 driving and outside the polygon 202) since the user of the vehicle 108, device 102 and/or device 109 can desire to resume the operation of the vehicle 108 and/or device 109 upon return to the vehicle 108 and/or while waiting in the vehicle 108 for an arriving airline passenger.

In some embodiments, the polygon 204 can comprise at least a portion of the terminal. In embodiments in which the mobile device 104 of an entity associated with the vehicle 108 or device 102 is determined to be located inside a terminal, and therefore inside polygon 204, the power level of the vehicle 108, device 102 and/or device 109 can be reduced or increased depending on whether there are one or more indications that the mobile device 104 is in the arriving portion of the terminal or the departure portion of the terminal (e.g., since there can be a prediction and/or determination that the user associated with the vehicle 108, device 102 and/or device 109 is the user associated with the mobile device 104 and therefore the user is likely leaving for or returning from a trip and the device 109, device 102 and/or vehicle 108 can be moved to a reduced or increased power level).

In some embodiments, controller device 106 can receive information (from the device 102, device 109 or one or more of the navigation devices 120, 122) indicating vehicle 108, device 102 and/or device 109 is located within landmark 116. In some embodiments, the controller device 106 can provide such information to the device 102 or device 109.

Accordingly, utilizing triggers from location based services (e.g., GPS for example, via navigation component 120) and mapping/navigation maps a device 102, device 109 and/or vehicle 108 can detect that it is being parked (or, in some embodiments, is parked) in an airport long-term parking area. In this case, the device 102, device 109 and/or vehicle 108 may be able to self-realize its location and move itself into a lower power or deep sleep mode thus making the time that it can stay in this mode as long as possible due to battery life preservation.

In some embodiments, it is possible that the device 102, device 109 and/or vehicle 108 can generate a prompt first for permission of the device 102, device 109 and/or vehicle 108 to adjust the power level of the device 102, device 109 and/or vehicle 108. The prompt can be audio, video or otherwise. For example, in some embodiments, for example, the device 102, device 109 and/or vehicle 108 can determine and/or receive information indicating that the vehicle is parked at an airport parking facility and the device 102, device 109 and/or vehicle 108 can output an audio or visual display indicating its location and asking if the device 102, device 109 and/or vehicle 108 can go into a lower power mode. The lower power mode can be triggered, in this embodiment, if an affirmative response is received at the device 102, device 109 and/or vehicle 108 by the user entity of the device 102, device 109 and/or vehicle 108.

In various embodiments, different services or different capabilities of the device 102, device 109 and/or vehicle 108 can be suspended and/or operation modified at different levels for the same device 102, device 109 and/or vehicle 108. As such, in some embodiments, for a particular one of the device 102, device 109 and/or vehicle 108, a particular component of the device 102, device 109 and/or vehicle 108 can be modified to have a first power level while another component can have a second power level. For example, remote door unlock function for the vehicle 108 can have a first power level operation and response time while location-based services for the vehicle 108 can have a second power level and response time.

Figure 3:
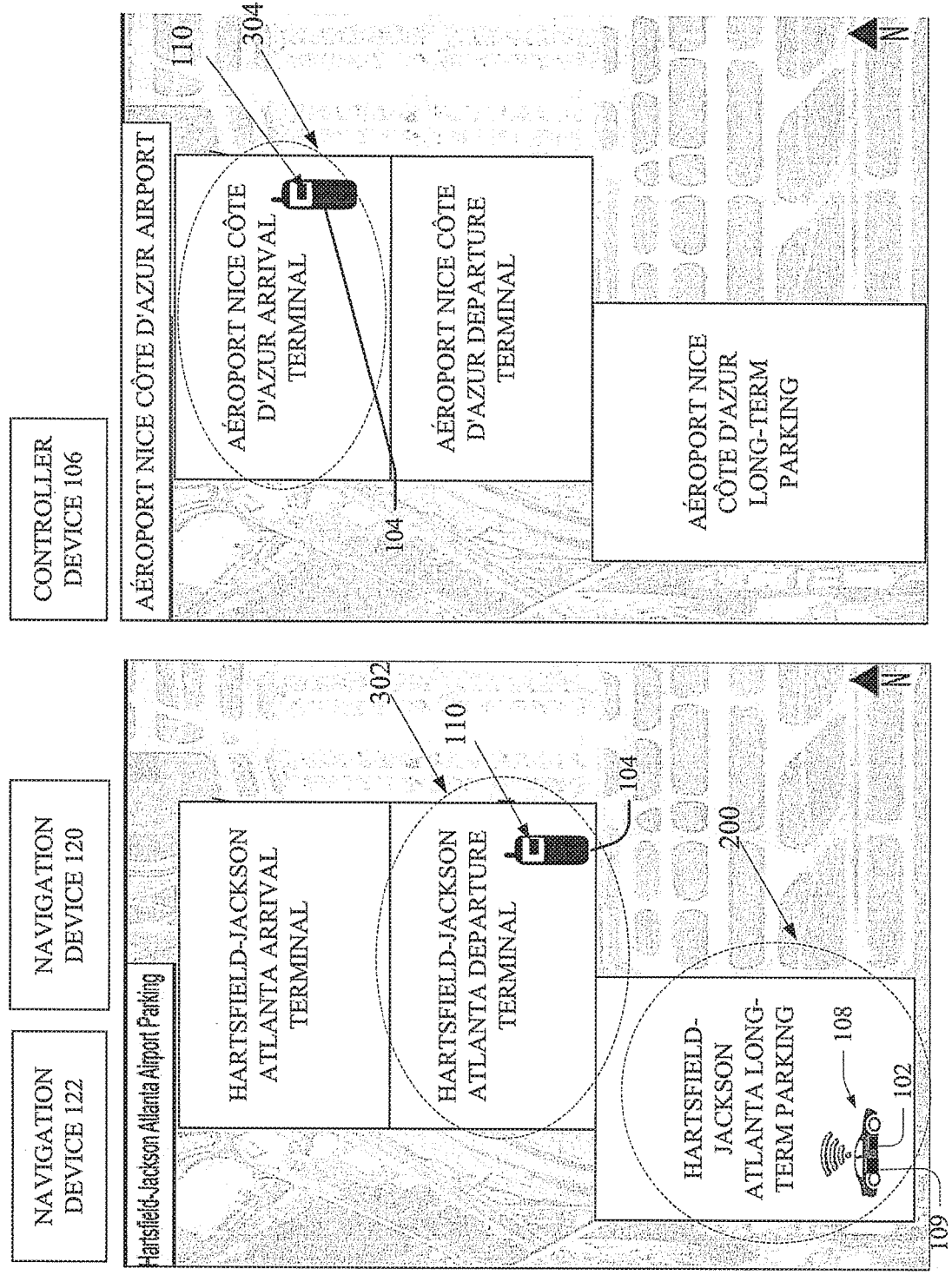
FIG. 3 illustrates another example schematic diagram comprising airport venues that can be identified in combination with mobile device information to facilitate power conservation for devices based on likelihood of power usage level in accordance with one or more embodiments described herein.

FIG. 3 illustrates another example schematic diagram comprising airport venues that can be identified in combination with mobile device information to facilitate power conservation for devices based on likelihood of power usage level in accordance with one or more embodiments described herein. Repetitive description of like elements employed in other embodiments described herein is omitted for sake of brevity.

In the system shown in FIG. 3, the mobile device 104 and/or the mobile device—controller device application component 110 can communicate with the controller device 106 and/or be tracked by one or more of the navigation devices 120, 122 and a determination can be made as to the location of the mobile device—controller device application component 110 or the relative distance between the mobile device—controller device application component 110 and a landmark of interest (e.g., long-term parking lot, arrival terminal of a first airport, departure terminal of a first airport, arrival terminal of a second airport or departure terminal of a second airport, vehicle 108 location, device 102 location, device 109 location) and the device 102, device 109 and/or vehicle 108 can be controlled to be reduced in power level accordingly (or to have an increase in power level from a reduced power level). Accordingly, FIG. 3 shows an embodiment that expands functionality beyond reducing power level to also increasing power level at appropriate times to preserve battery life while also providing for improved user command responsiveness.

For example, in the system shown in FIG. 3, one or more of the navigation systems 120, 122 can determine that a mobile device 104 associated with a user entity for the vehicle 108 is located at a departure terminal of an airport (as shown) and/or that the mobile device 104 has arrived at an arrival terminal in a location remote from the city in which the device 102, device 109 and vehicle 108 are located. As shown in FIG. 3, for example, one or more of the navigation systems 120, 122 can locate the mobile device 104 and/or the mobile device—controller device application component 110 within a location bounded by polygon 302. The location bounded by polygon 302 can represent a departure terminal at a location corresponding to the airport at which the vehicle 108 is parked, for example, and/or at which the device 102 or device 109 are co-located with the vehicle 108. In some embodiments, the mobile device 104 and/or the mobile device—controller device application component 110 can be located within a polygon 304 representing an area associated with an arrival terminal of an airport remote from the vehicle 108 and/or the device 102 or device 109 co-located with the vehicle 108.

Based on a determination that the mobile device 104 and/or the mobile device—controller device application component 110 is located at polygons 302 or 304, and the fact that such location tends to indicate the user of the vehicle 108 and/or the device 102 or device 109 is not likely to have need to use the vehicle 108 or device 109 for an extended time period (because the user will be out of town), the device 109, vehicle 108 and/or device 102 can be powered down to operate in lower power level state.

In some embodiments, although not shown, in cases in which one or more of the navigation devices 120, 122 detects that the mobile device 104 and/or the mobile device—controller device application component 110 is located in an area associated with the arrival terminal of the airport at which the vehicle 108, device 102 and/or device 109 is located, the vehicle 108, device 102 and/or device 109 can be controlled to be powered up such that the power level of the vehicle 108, device 102 and/or device 109 is increased to enable the vehicle 108, device 102 or device 109 to provide one or more various functions likely to be desired by a user upon return to the vehicle (e.g., remote door unlock, remote trunk open, heating or air conditioning of automobile).

Similarly, in some embodiments, although not shown, one or more of the navigation devices 120, 122 can determine that the mobile device 104 and/or the mobile device—controller device application component 110 is located within the long-term parking lot but moving away from the vehicle 108, device 102 or device 109 based on a determination that the distance between the vehicle 108, device 102 or device 109 and/or the mobile device 104 and/or the mobile device—controller device application component 110 is increasing. As such, a determination or prediction can be made that the vehicle 108, device 102 and/or device 109 is not likely to need to be used within a defined amount of time in the future and the vehicle 108, device 102 and/or device 109 can be reduced to a lower power level.

By contrast, in some embodiments, although not shown, one or more of the navigation devices 120, 122 can determine that the mobile device 104 and/or the mobile device— controller device application component 110 is located within the long-term parking lot or arrival terminal and moving toward the vehicle 108, device 102 or device 109 based on a determination that the distance between the vehicle 108, device 102 or device 109 and/or the mobile device 104 and/or the mobile device—controller device application component 110 is decreasing. As such, a determination or prediction can be made that the vehicle 108, device 102 and/or device 109 can be controlled to have an increased power level as the vehicle 108, device 102 and/or device 109 is likely to be used within a defined future time period after the determination is made since the mobile device 104 and/or the mobile device—controller device application component 110 is located within the long-term parking lot and moving toward the vehicle 108.

In some embodiments, a determination can be made as to whether the vehicle 108 is likely to be parked at a venue associated with a defined event that results in a particular likelihood or determination the vehicle 108, device 109 and/or the device 102 will not be used by the user associated with the vehicle 108 for a defined amount of time. For example, the determination regarding the identity of the event can be made based on the location at which the vehicle 108 is parked (or the vehicle 108, device 109 and/or the device 102 is located). For example, if the vehicle 108 is determined to be parked at a symphony parking lot or at a baseball stadium parking lot, a determination can be made that the vehicle 108, device 102 and/or the device 109 is not likely to be used for several hours and the power level of the vehicle 108 and/or the device 102 or device 109 can be reduced accordingly.

In another example, not shown, different polygons of an area can represent parking lots of sporting venues. As such, if the device 102 determines that the vehicle 108 or device 109 associated with the device 102 is located in a parking lot of a sporting venue, the device 102 can control the device 102, device 109 and/or the vehicle 108 to go to a lower power mode for a length of time associated with the length of the sporting event (or associated with a defined amount of time less than the length of the sporting event). In some embodiments, for example, if the device 102 determines the vehicle 108 is located at a parking lot of a baseball sporting venue, the device 102 can generate information to cause the device 102, device 109 and/or the vehicle 108 to go into a low power mode for a defined amount of time less than the time of the sporting event. For example, if the sporting event is approximately two hours, the device 102 can control the device 102, device 109 and/or the vehicle 108 to move to a lower power level for 90 minutes. As such, the device 102 can employ the location and the event to determine whether to reduce the power level of the device 102, device 109 and/or the vehicle 108.

In some embodiments, the power reduction can be for a defined amount of time based on the type of event or based on the type of vehicle 108 and/or device 109 or device 102, based on historical usage of the vehicle 108, device 109 and/or device 102 (the past amount of time the device was controlled to have a reduced power level), based on a user profile indicated preferred length of time for power level modification, based upon detection of the mobile device 104 or mobile device—controller device application component 110 being located within a defined distance of the vehicle 108, device 102 or device 109 and approaching the vehicle 108, device 102 or device 109. In some embodiments, the time to awaken can be changed from time to time based on a desired balance between responsiveness and battery life preservation.

While the embodiments described have been for automotive cases on paved roadways/parking lots, one or more embodiments described herein can be extended to other types of vehicles. For example, a marine vehicle can comprise a device (such as device 102) that can determine and/or control the marine vehicle and/or another device of the marine vehicle to move into a low power level mode or a higher power level mode based on the marine vehicle being docked at the boat docket or the mobile device—controller device application component 110 approaching the marine vehicle at a time that the marine vehicle is operating at a reduced power level and therefore based on the determination that the marine vehicle will soon be used.

In some embodiments, the vehicle can be farm equipment such as a tractor. Accordingly, an event can be detected and used as an indicator of time to increase power or reduce power of the farm equipment or a device used with the farm equipment. Accordingly, at the end of crop season, the vehicle and/or a device that operates with the vehicle can be controlled to operate in a lower power level mode. Similarly, at the beginning of the seed planting season, the vehicle and/or a device operating with the vehicle can be controlled to operate at a higher power level mode.

Location can also be used to determine how to control power levels. For example, if the vehicle is parked in the barn or a designated area of a field, the vehicle and/or one or more devices of the vehicle can be controlled to operate in a lower power level mode. In some embodiments, mere inactivity can be employed as a trigger to change to a lower power level state without consideration of geographic or location information. For example, after half hour of inactivity, a device 102, device 109 and/or vehicle 108 can activate, or be controlled to operate in, a low or lower power state.

In some embodiments, a calendar component or other trigger device can be included in or otherwise associated with the device 102, device 109 and/or vehicle 108 to cause the device 102, device 109 and/or vehicle 108 to awaken or move into a higher power level after a defined amount of time in the lower power level mode has passed.

In some embodiments, upon detecting a mobile device 104 or mobile device—controller device application component 110 is located in an arrival terminal of a home airport for the vehicle 108, the vehicle 108 may be already powered down (or operating at a reduced power level) and the mobile device 104 and/or mobile device—controller device application component 110 can communicate with the controller device 106 or, in some cases, with a telematics service provisioning component 112 that can cause one or more of the vehicle 108, device 102 and/or device 109 to awaken, move to a higher power level or the like. Thus, there can be three-way communication between the mobile device— controller device application component 110, controller device 106 and/or device 102, device 109 or the vehicle 108. Within the three way communication network, the vehicle 108 or device 102 can generate information transmitted to the controller device 106 to inform the controller device 106 the vehicle 108, device 109 and/or device 102 is located at a defined venue and the controller device 106 can transmit to the mobile device—controller device application component 110 information identifying the mobile device 104 as being located at the particular venue.

The mobile device—controller device application component 110 can then execute one or more aspects of a cycle of operation generating information indicating the mobile device—controller device application component 110 has left a defined region near the defined venue (or the controller device 106 can receive such information generally, for example, from the mobile device—controller device application component 110 and/or one or more of navigation devices 120, 122).

The mobile device—controller device application component 110 can generate information and/or the controller device 106 can receive information indicating the mobile device—controller device application component 110 is now located in a new city/region/country relative to the initial location at which the mobile device—controller device application component 110 was determined to be located. For example, the updated information can be transmitted to the controller device 106 from the mobile device 104 upon power cycling the mobile device 104 in some embodiments. In some embodiments, the mobile device—server device application control component 110 can automatically trigger one or more operations of the mobile device 104 for detection of one or more events (e.g., the mobile device 104 has landed on airport tarmac after being in-flight) and the mobile device 104 can transmit information to the controller device 106 indicating the mobile device 104 just completed the on/off power cycle. For example, in cases in which the mobile device 104 is detected to be back in the city in which the vehicle 108, device 109 or device 102 is located, the mobile device 104 can generate information causing the controller device 106 to generate information causing the vehicle 108, device 109 or device 102 to awaken and/or move to a higher power level mode (e.g., move out of a mode of taking long (e.g., 15 minute) intervals between awakening and begin to take shorter intervals of awakening) so that the vehicle 108, device 102 and/or device 109 can be more responsive to any user commands upon arrival of the user entity associated with the mobile device 104 at or in proximity to the vehicle 108 or device 109 (e.g., for functions such as turning on car, unlocking doors, etc.). Accordingly, the controller device 106 can transmit a message or signal to the vehicle 108, device 102 and/or device 109 controlling the vehicle 108, device 102 and/or device 109 to go back to full power mode (or a higher power level generally) the next time the vehicle 108, device 102 and/or device 109 awakens. As such, in various embodiments, operations such as employing the mobile device 104 to unlock the door (because the door unlocks have been powered up to a higher power level after being powered down) can be facilitated because the responsiveness can be enhanced since the mobile device 104 has been detected to be in a defined city or proximity relative to the device 102, device 109 and/or the vehicle 108.

Figure 4:
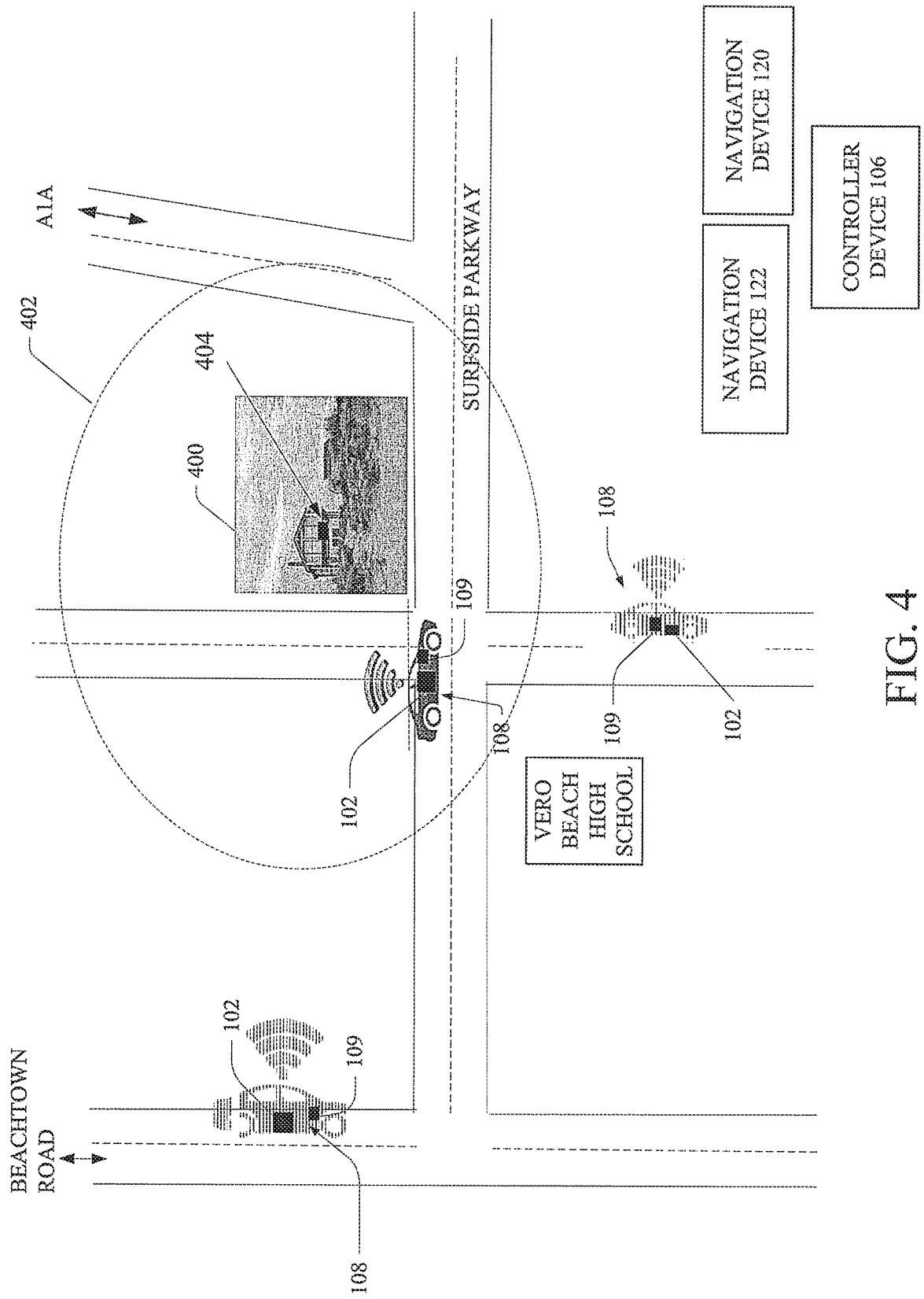
FIG. 4 illustrates an example schematic diagram comprising a networked home that can be identified in combination with device information to facilitate power conservation for devices based on likelihood of power usage level in accordance with one or more embodiments described herein.

FIG. 4 illustrates an example schematic diagram comprising a networked home that can be identified in combination with device information to facilitate power conservation for devices based on likelihood of power usage level in accordance with one or more embodiments described herein. Repetitive description of like elements employed in other embodiments described herein is omitted for sake of brevity.

In this embodiment, a device 404 can be located in a door of a vacation home 400 located within geographical region 402. The device 102 and/or a mobile device—controller device application component 110 can be co-located with vehicle 108 and device 109. The device 102 and/or the mobile device—controller device application component 110 can communicate with controller device 106 and the device 404 can be controlled to increase in power level when the device 102 is detected to be within region 402 or a proximity to geographic region 402.

For example, as the device 102 approaches the geographical location 402, the device 102 can communicate with a controller device 106 and transmit information alerting the controller device 106 that the device 102 is approaching the vacation house 400. For example, at a defined number of miles from the vacation house 400 (e.g., five miles from the house 400) or upon entering geographical location 402, the controller device 106 can transmit a signal to cause the device 404 at the vacation home 400 to turn on heat or air conditioning and/or turn on one or more other systems associated with the vacation home 400.

In some embodiments, the vacation home 400 has cellular connectivity or a digital life system in which a controller for the vacation home 400 comprises an embedded cellular radio (e.g., embedded in a door lock, etc.) and most of the time the radio can be a low power state because it is not being used (since the home is a vacation house 400) but upon arrival at the vacation home 400 or within region 402, the radio (e.g., which can be represented as 404) and/or other systems of the vacation home 400 can be controlled to improve responsiveness. In some embodiments, the controls can be powered up when the device 102 is detected a defined number of miles away and approaching the vacation home 400 while the controls can be placed in low power mode when the device 102 is the same or another defined number of miles away and leaving the vacation home 400. The device 102 can determine whether the device 102 is approaching or leaving the vacation home based on the distance from the vacation home 400 at different points of time (e.g., whether the distance is progressively getting less or progressively getting greater).

Figure 5:
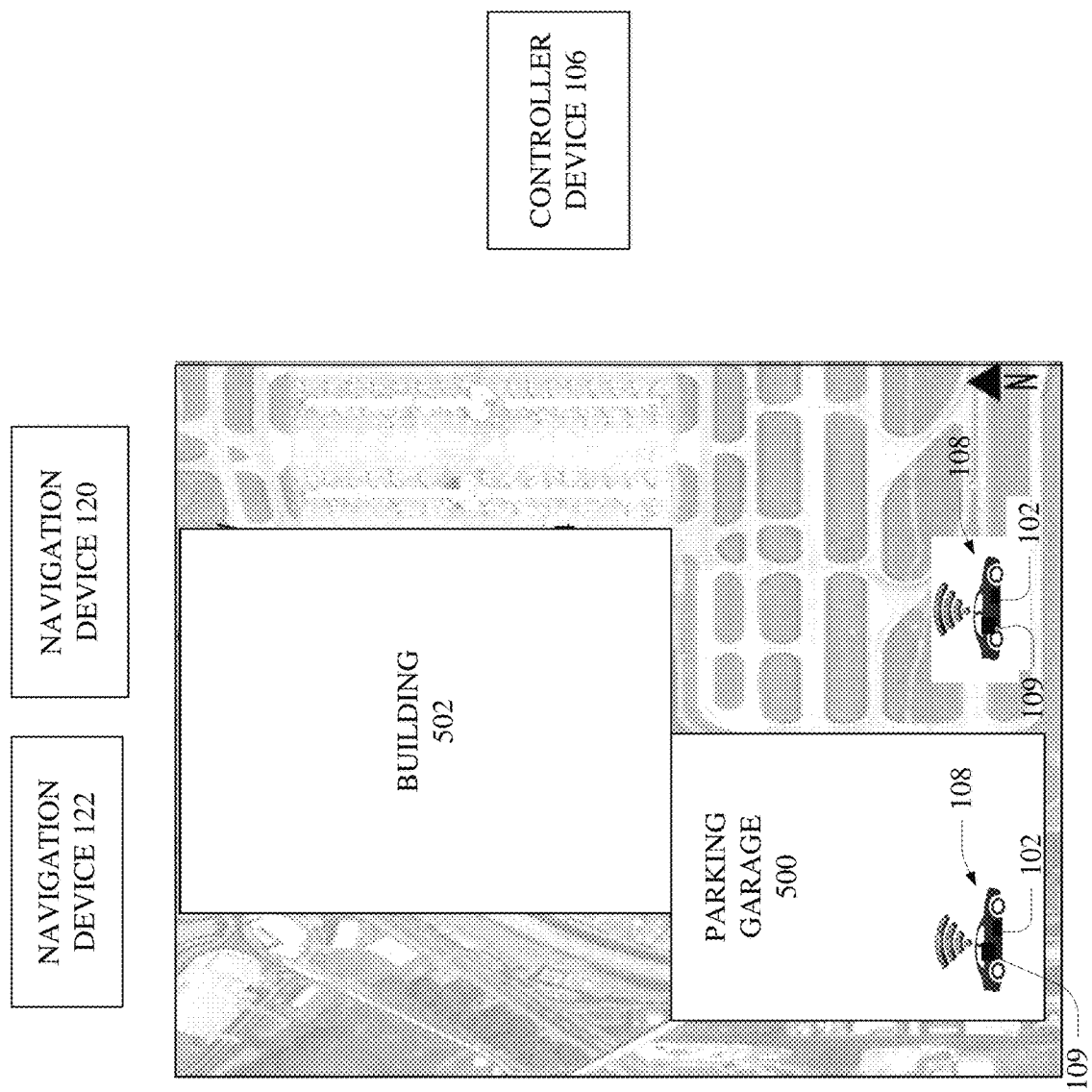
FIG. 5 illustrates an example schematic diagram comprising a parking garage structure that can be identified to facilitate power conservation for devices based on likelihood of power usage level in accordance with one or more embodiments described herein.

FIG. 5 illustrates an example schematic diagram comprising a parking garage structure that can be identified to facilitate power conservation for devices based on likelihood of power usage level in accordance with one or more embodiments described herein. Repetitive description of like elements employed in other embodiments described herein is omitted for sake of brevity.

In this embodiment, one or more of navigation devices 120, 122 can be employed to alternatively provide navigation services to the vehicle 108 (or to device 109) based on the one of one or more navigation devices 120, 122 likely to be accessible by the vehicle 108, device 102 and/or device 109 based on the location of the vehicle 108, device 102 and/or device 109 and corresponding estimated power that would be expended to contact the navigation devices 120, 122.

For example, navigation device 120 can be the GPS location system, which can be readily accessible by the device 102 or device 109 of vehicle 108 when the vehicle 108 is outside of the parking garage 500 (shown at time 2). As such, in embodiments, device 109 of the vehicle 108 that is associated with contacting the GPS location system can be controlled to turn on when the vehicle is located outside of parking garage 500. The device 102 can detect when the vehicle 108 is outside of the underground garage and can obtain line of sight (LOS) to a GPS satellite, and can cause the vehicle 108 or device 109 to turn the GPS receiver/device/radio on. As such, the vehicle 108 can have dual technology and can use Iridium or GPS alternately to save power.

By contrast, navigation device 122 can be the Iridium location system, which can be readily accessible by the device 109 of vehicle 108 when the vehicle is inside the parking garage 500 (shown at time 1). As such, device 109 of the vehicle 108 that is associated with contacting the Iridium location system can be controlled to turn on when the vehicle is located inside of parking garage 500. Because Iridium has a stronger signal than GPS, the Iridium signal can penetrate into buildings better than GPS signals. Accordingly, when the device 102 determines it is located in an underground parking lot, the device 102 can cause the vehicle 108 or the device 109 of the vehicle 108 to turn on the Iridium signal since a GPS signal may difficult to obtain and such can avoid or reduce the likelihood of waste of power via the vehicle 108 radio continually scanning and searching for a GPS signal while in an area in which the GPS signal is very difficult to receive. In this regard, a GPS receiver of device 109 can be moved into a lower power level operation (or sleep mode altogether). In some embodiments, types of location services such as Iridium and GPS can be disabled. Both types of services can operate in a common device (e.g., device 109) in some embodiments.

Accordingly, when the device 102 is in an area in which the navigation device 120 is not readily accessible (e.g., some systems are not accessible when the device 102 is inside a building) then in lieu of using power to continually try to contact the satellite of the navigation device 120, device 109, which contacts the navigation device 120 can be turned off and device 109, which contacts the navigation device 122 can be employed. While navigation device 120 may be more accurate than navigation device 122, power can be conserved by strategically employing different ones of navigation devices 120, 122 depending on the likelihood of contacting the satellite, and therefore reducing power expended.

Also, in some embodiments, a determination (e.g., by the device 102, controller device or navigation devices 120, 122) of location and that the vehicle 108 is stationary and inside a covered garage can enable the last known location of the vehicle 108 to be employed until such time it is detected that the vehicle 108 is moved again thus allowing the entire Global Navigation Satellite System (GNSS) functionality in the vehicle 108, device 102 or device 109 to be turned down/reduced to a lower power level.

One or more embodiments can utilize location-based information to determine which radio functions can be accessed and which radio functions cannot be accessed. For example, in embodiments in which the device 102 has determined that the device 102 is in an area with no Wi-Fi coverage, one or more steps can be taken to turn off the Wi-Fi radio in the vehicle or component thus saving critical battery life until entering into an area of potential coverage.

While the embodiments described comprise automatic control of the power level for one or more devices without user intervention, in some embodiments, the device 109 or the device 102 or the vehicle 108 can be controlled based on a response received from a user of the vehicle 108, device 102 and/or device 109. For example, prior to reducing or increasing the power level, the device 102 and/or device 109 can generate an output (e.g., audio, graphical or otherwise) for which a response can be generated to control the device 102, device 109 and/or vehicle 108 to change power levels.

Figure 6:
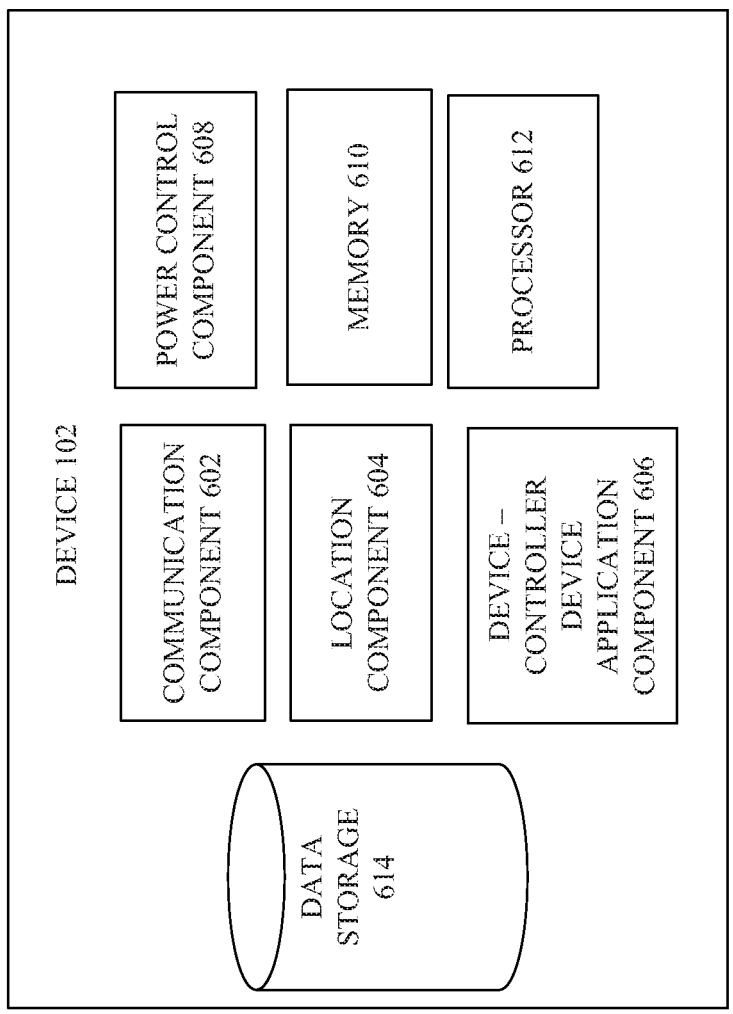
FIG. 6 illustrates an example block diagram of a device for which power conservation can be facilitated based on likelihood of power usage level in accordance with one or more embodiments described herein.

FIG. 6 illustrates an example block diagram of a device for which power conservation can be facilitated based on likelihood of power usage level in accordance with one or more embodiments described herein. Repetitive description of like elements employed in other embodiments described herein is omitted for sake of brevity. The device 102 can comprise a communication component 602, location component 604, device—controller device application control component 606, power control component 608, memory 610, processor 612 and/or data storage 614. In various embodiments, one or more of communication component 602, location component 604, device—controller device application control component 606, power control component 608, memory 610, processor 612 and/or data storage 614 can be electrically and/or communicatively coupled to one another to perform one or more functions of the device 102.

The communication device 602 can be configured to transmit and/or receive information such as location information from one or more navigation devices and/or command information to modify the power level of one or more of the device 102, device 109, vehicle 108 or the like. The location component 604 can process one or more geographical coordinates or other information to determine boundaries of a particular landmark, location of the device 102, device 109 and/or vehicle 108 or the like. The device—controller device application control component 606 can communicate with the controller device 106 to determine to reduce or increase the power level of the device 102. The power control component 608 can adjust the power level and/or the operational mode of the device 102 and/or cause the power level or operational mode of the device 109 and/or vehicle 108 to be adjusted.

The memory 610 can be a computer-readable storage medium storing computer-executable instructions and/or information configured to perform one or more of the functions described herein with reference to device 102. The processor 612 can perform one or more of the functions described herein with reference to device 102 comprising receiving and/or processing location information, changing power level operation modes of the device 102 or another device or the like. Data storage 614 can comprise location information 702 such as coordinates regarding current or historical locations of the device 102, vehicle 108 and/or device 109, geographical and landmark information 704 such as information identifying one or more geographical areas/locations (e.g., vacation home location, airport parking lot, boat dock).

Figure 7:
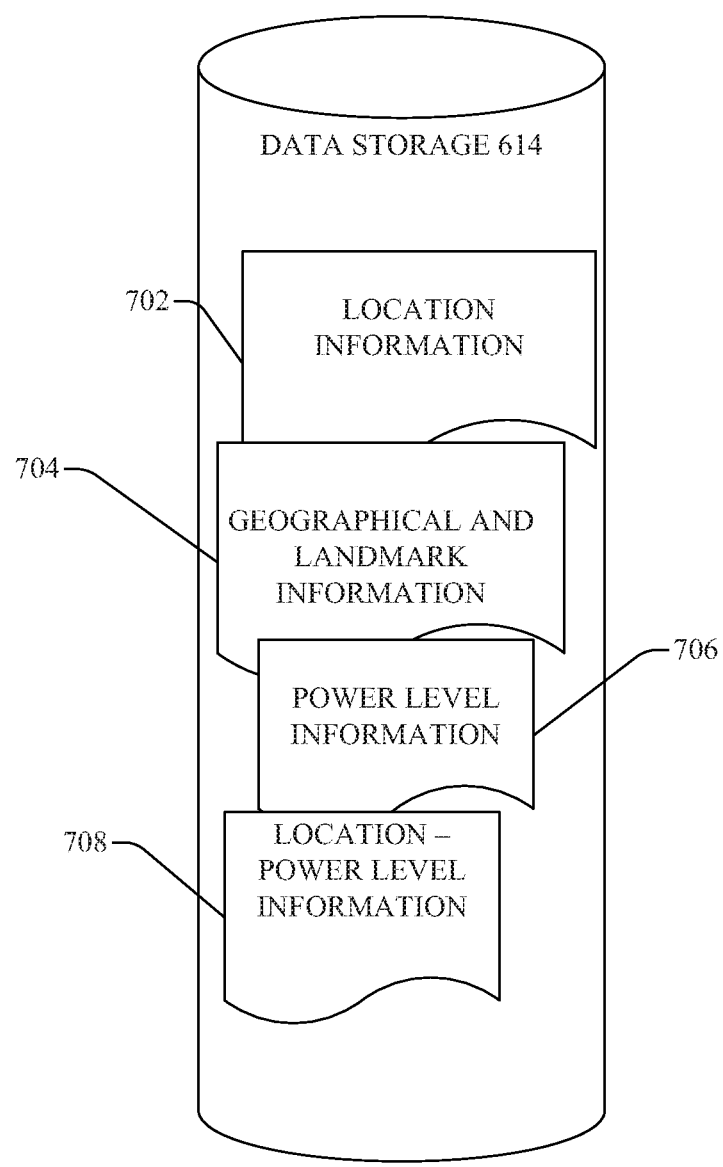
FIG. 7 illustrates an example block diagram of a data storage component of the device of FIG. 6 for which power conservation can be facilitated based on likelihood of power usage level in accordance with one or more embodiments described herein.

FIG. 7 illustrates an example block diagram of a data storage component of the device of FIG. 6 for which power conservation can be facilitated based on likelihood of power usage level in accordance with one or more embodiments described herein. Power level information 706 can comprise information such as different levels of power to which to cause the vehicle 108 to set one or more radios or communication devices, location power level information 708 such as power levels to cause the vehicle 108 to set radios or communication devices to based on the location of the device (e.g., parking lot for long-term parking). The location power level information 708 can also comprise event information, which can be factored into a determination as to whether to modify power level and/or for how to continue the modification.

Figure 8:
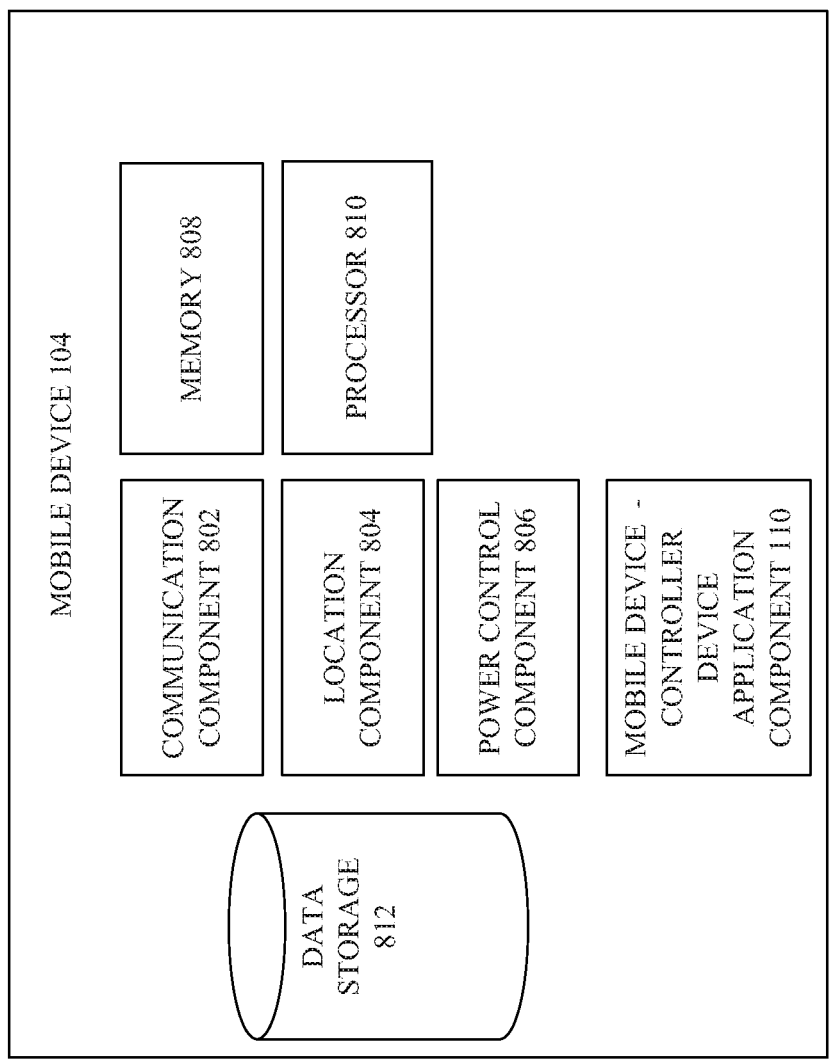
FIG. 8 illustrates an example block diagram of a mobile device that can be employed to facilitate power conservation for devices based on likelihood of power usage level in accordance with one or more embodiments described herein.

FIG. 8 illustrates an example block diagram of a mobile device that can be employed to facilitate power conservation for devices based on likelihood of power usage level in accordance with one or more embodiments described herein. Repetitive description of like elements employed in other embodiments described herein is omitted for sake of brevity.

The mobile device 104 can comprise a communication component 802, location component 804, power control component 806, mobile device—controller device application component 110, memory 808, processor 810 and/or data storage 812. In various embodiments, one or more of the communication component 802, location component 804, power control component 806, mobile device—controller device control component 110, memory 808, processor 810 and/or data storage 812 can be electrically and/or communicatively coupled to one another to perform one or more functions of the mobile device 104.

The communication device 802 can be configured to transmit and/or receive information such as location information of the mobile device (e.g., in embodiments such as that described with reference to FIG. 3). The location component 804 can process one or more geographical coordinates or other information and/or generate information indicating the mobile device has entered a city or is approaching or walking away from a vehicle or other landmark. The power control component 806 can cause the power level and/or the operational mode of a device to be adjusted (e.g., cause power level to be increased for a radio in a door lock as the mobile device 104 approaches the door). The mobile device—controller device control component 110 can communicate with the controller device 106 to determine to reduce or increase the power level of the device 102 and/or provide one or more (or all) operations described with reference to such device herein.

The memory 808 can be a computer-readable storage medium storing computer-executable instructions and/or information configured to perform one or more of the functions described herein with reference to mobile device 104. The processor 810 can perform one or more of the functions described herein with reference to mobile device 104. Data storage 812 can store information comprising an associated vehicle or device controlled by or electrically coupled to the vehicle, identity of a controller device, location information for the mobile device, vehicle or other device, user entity preferences regarding activation of controls of one or more devices (e.g., heating and cooling temperatures at the vacation home of FIG. 4 to activate upon detection of the mobile device 104 within a defined vicinity of the vacation home).

Figure 9:
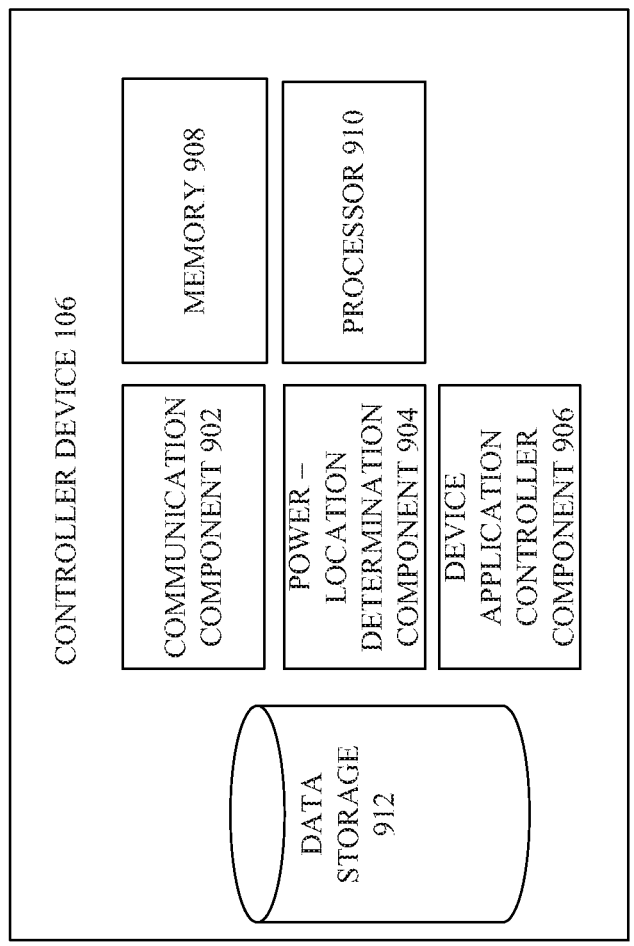
FIG. 9 illustrates an example block diagram of a controller device that can facilitate power conservation for devices based on likelihood of power usage level in accordance with one or more embodiments described herein.

FIG. 9 illustrates an example block diagram of a controller device that can facilitate power conservation for devices based on likelihood of power usage level in accordance with one or more embodiments described herein. Repetitive description of like elements employed in other embodiments described herein is omitted for sake of brevity.

The controller device 106 can comprise communication component 902 (which can transmit or receive information to/from the controller device to/from the navigation devices, vehicle, mobile device or other device); power—location determination component 904 (which can generate commands to adjust and/or information identifying power levels for operation by a device); device application controller component 906 (can communicate with a device or mobile device to adjust power or other operation of the device or mobile device), memory 908, processor 910 and/or data storage 912. The memory 908 can be a computer-readable storage medium storing computer-executable instructions and/or information configured to perform one or more of the functions described herein with reference to controller device 106. The processor 910 can perform one or more of the functions described herein with reference to controller device 106. Data storage 912 can store information comprising current or historical power levels of one or more devices or mobile devices, power levels to which a device or mobile device should adjust for one or more particular landmarks, location information for a device or mobile device or the like.

Figure 10:
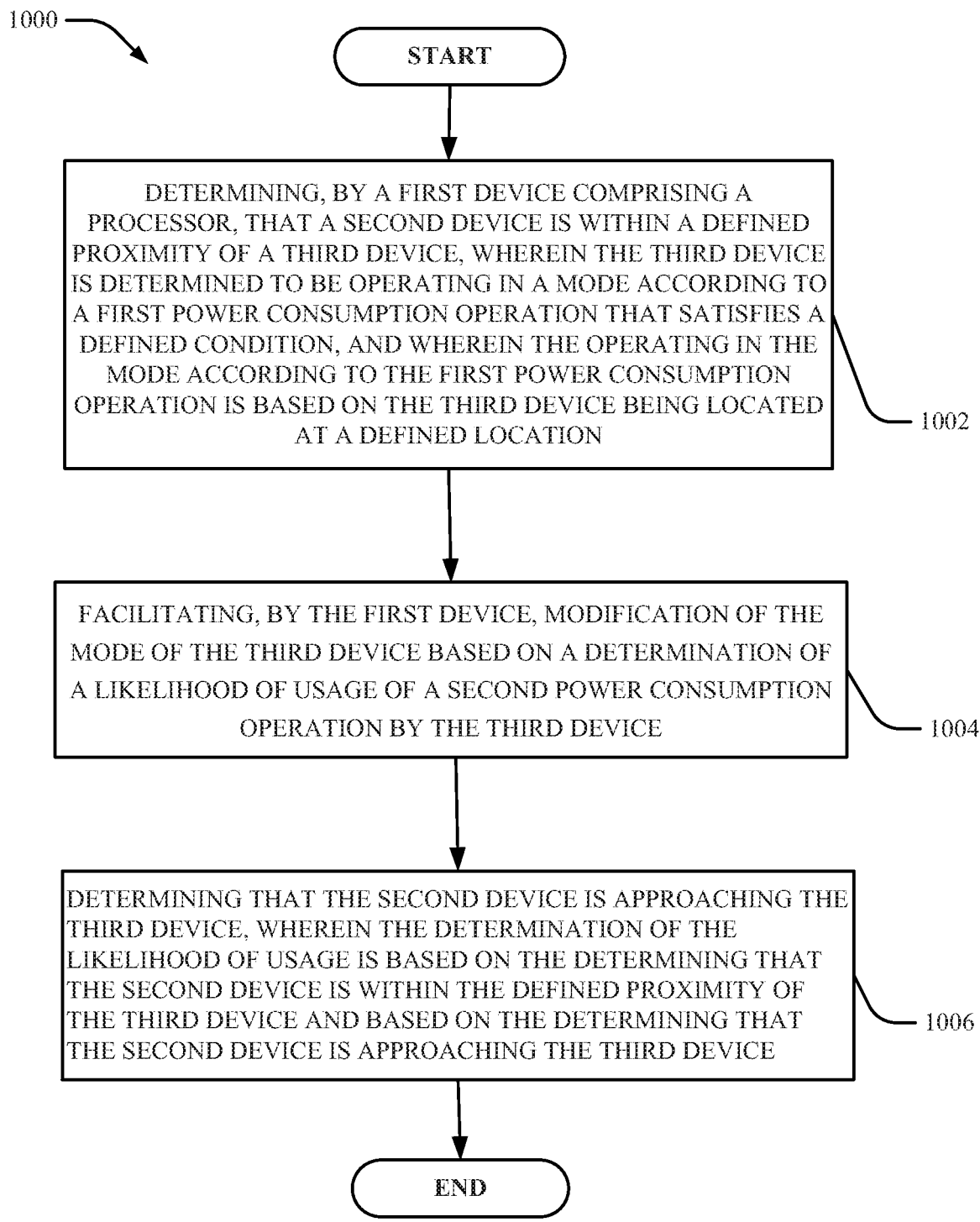
FIGS. 10 and 11 are flowcharts of methods that facilitate power conservation for devices based on likelihood of power usage level in accordance with one or more embodiments described herein.
Figure 11:
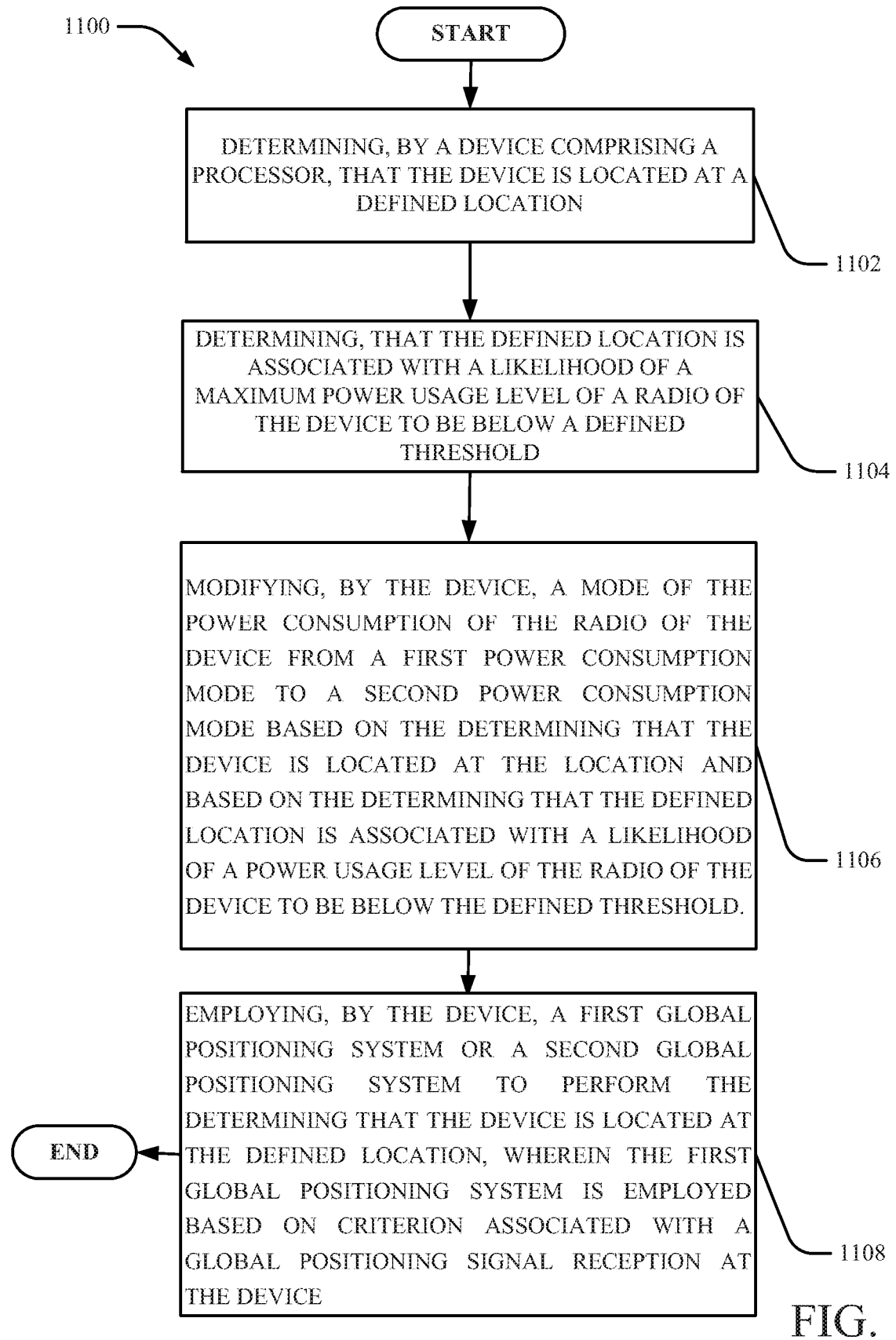

FIGS. 10 and 11 are flowcharts of methods that facilitate power conservation for devices based on likelihood of power usage level in accordance with one or more embodiments described herein. Repetitive description of like elements employed in other embodiments described herein is omitted for sake of brevity.

Turning first to FIG. 10, at 1002, method 1000 can comprise determining, by a first device comprising a processor, that a second device is within a defined proximity of a third device, wherein the third device is determined to be operating in a mode according to a first power consumption operation that satisfies a defined condition, and wherein the operating in the mode according to the first power consumption operation is based on the third device being located at a defined location.

In some embodiments, the third device comprises a vehicle and the second device comprises a mobile device associated with a user of the vehicle. In some embodiments, the vehicle comprises a marine vehicle. In some embodiments, the third device comprises a radio associated with a lock of a stationary structure and the second device comprises a mobile device associated with a user of the stationary structure.

In some embodiments, the first power consumption operation is associated with a first latency of response time for the third device and the second power consumption operation is associated with a second latency of response time, wherein the first latency is greater than the second latency.

At 1004, method 1000 can comprise facilitating, by the first device, modification of the mode of the third device based on a determination of a likelihood of usage of a second power consumption operation by the third device.

In some embodiments, the second power consumption operation is an increased power consumption operation relative to the first power consumption operation, and the facilitating the modification of the mode comprises facilitating a change to the increased power consumption operation at a time of the determination of the likelihood of usage.

In some embodiments, at 1006, method 1000 can comprise determining that the second device is approaching the third device, wherein the determination of the likelihood of usage is based on the determining that the second device is within the defined proximity of the third device and based on the determining that the second device is approaching the third device.

In some embodiments, although not shown, method 1000 can comprise determining a duration during which to perform the first power consumption operation, wherein the determining the duration is based on the defined location of the first device.

Turning now to FIG. 11, at 1102, method 1100 can comprise determining, by a device comprising a processor, that the device is located at a defined location. At 1104, method 1100 can comprise determining, that the defined location is associated with a likelihood of a maximum power usage level of a radio of the device to be below a defined threshold.

At 1106, method 1100 can comprise modifying, by the device, a mode of the power consumption of the radio of the device from a first power consumption mode to a second power consumption mode based on the determining that the device is located at the location and based on the determining that the defined location is associated with a likelihood of a power usage level of the radio of the device to be below the defined threshold.

In some embodiments, even though not shown, method 1100 can also comprise employing, by the device, a first global positioning system or a second global positioning system to perform the determining that the device is located at the defined location, wherein the first global positioning system is employed based on criterion associated with a global positioning signal reception at the device.

In some embodiments, the first global positioning system is associated with stronger in-building or underground global positioning signal reception than the second global positioning system signal reception.

In some embodiments, although not shown, method 1100 can also comprise determining, by the device, an event associated with a user of the radio. For example, the event can comprise a second device associated with the user determined to be moving away from the device. In some embodiments, the event comprises a defined likelihood of attendance at a sporting event having a duration greater than a defined value.

In some embodiments, the defined location comprises an airport parking facility of airport parking facilities associated with respective likelihoods of the maximum power usage level of the radio of the device being below the defined threshold based on respective types of the airport parking facilities.

Figure 12:
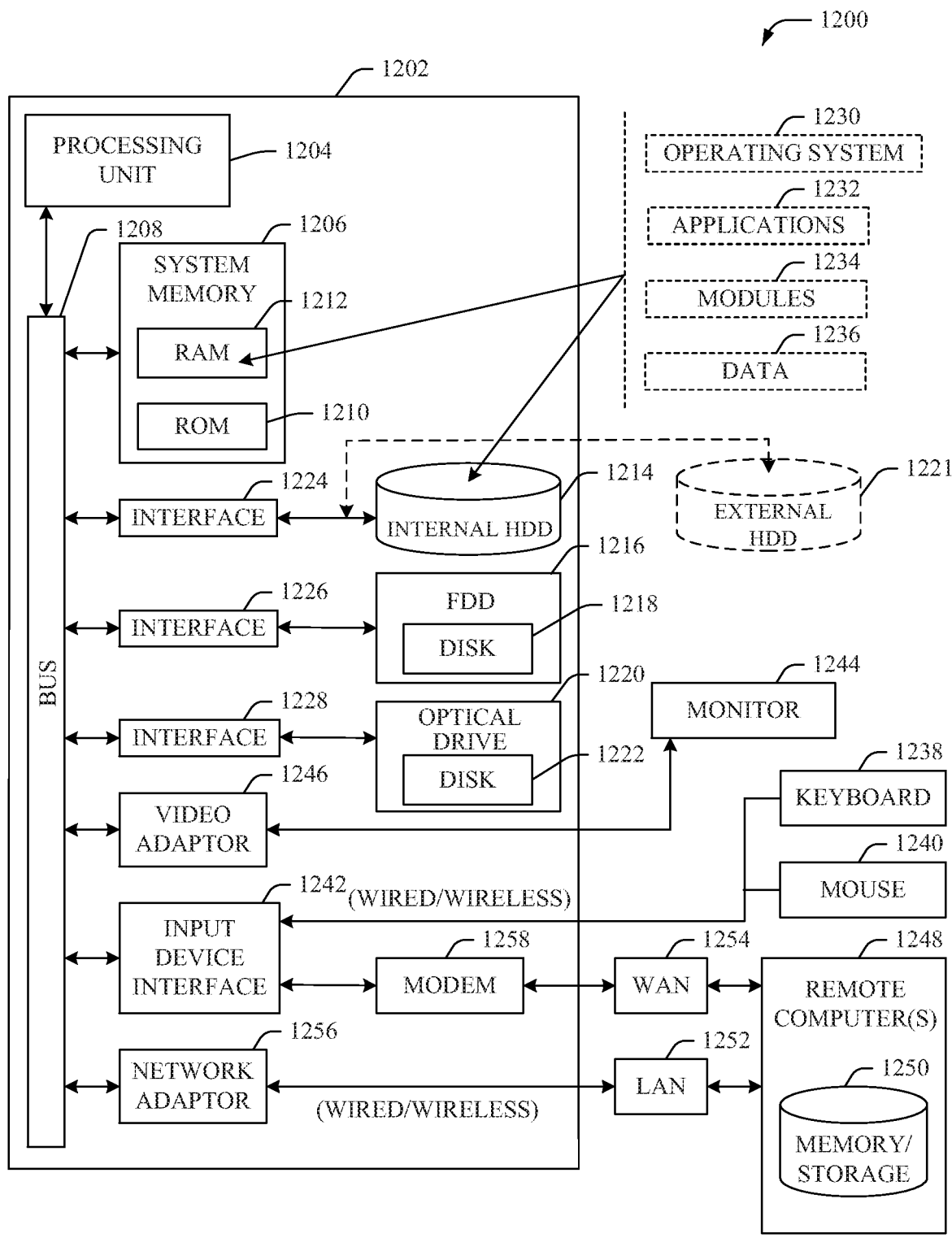
FIG. 12 illustrates a block diagram of a computer that can be employed in accordance with one or more embodiments.

FIG. 12 illustrates a block diagram of a computer that can be employed in accordance with one or more embodiments. Repetitive description of like elements employed in other embodiments described herein is omitted for sake of brevity.

In some embodiments, the computer, or a component of the computer, can be or be included within any number of components described herein comprising device 102, mobile device 104, controller device 106 (or a component of device 102, mobile device 104, controller device 106).

In order to provide additional text for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can include computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various embodiments of the embodiments described herein comprises a computer 1202, the computer 1202 comprising a processing unit 1204, a system memory 1206 and a system bus 1208. The system bus 1208 couples system components comprising the system memory 1206 to the processing unit 1204. The processing unit 1204 can be any of various commercially available processors.

Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1210 (e.g., EIDE, SATA), which internal hard disk drive 1214 can also be configured for external use in a suitable chassis (not shown), a magnetic floppy disk drive 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface, respectively. The interface 1224 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1202, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A communication device can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier (s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM), or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a device comprising a processor, that a mobile device is within a first portion of a location and a vehicle is in a second portion of the location; and
   after the determining, facilitating, by the device, modification of enhanced discontinuous reception mode of the vehicle based on a determination of a likelihood of usage of an operation by the vehicle associated with a defined power consumption, wherein the operation is associated with a first latency of response time for the vehicle, wherein a current operation of the vehicle is associated with a second latency of response time, and wherein the first latency is greater than the second latency.

2. The method of claim 1, wherein the operation is an increased power consumption operation relative to a current power operation.

3. The method of claim 2, wherein the facilitating of the modification of the enhanced discontinuous reception mode comprises facilitating a change to the increased power consumption operation at a time of the determination of the likelihood of usage.

4. The method of claim 2, further comprising:
   determining, by the device, that the mobile device is approaching the vehicle, wherein the determination of the likelihood of usage is based on the determining that the mobile device is within the defined proximity of the vehicle and based on the determining that the mobile device is approaching the vehicle.

5. The method of claim 1, wherein the mobile device is associated with a user of the vehicle.

6. The method of claim 1, wherein the vehicle comprises a marine vehicle configured to operate according to power save mode.

7. The method of claim 1, wherein the vehicle comprises a radio associated with a lock of a stationary structure and the mobile device is associated with a user of the stationary structure.

8. The method of claim 1, further comprising:
   determining, by the device, a duration during which to perform the operation, wherein the determining the duration is based on the location of the device.

9. A non-transitory machine-readable storage medium, comprising executable instructions that, when executed by a processor, facilitate performance of operations, comprising:
   determining that a mobile device is within a first portion of a location and a vehicle is in a second portion of the location; and
   after the determining, facilitating modification of enhanced discontinuous reception mode of the vehicle based on a determination of a likelihood of usage of a defined power consumption operation by the vehicle, wherein the defined power consumption operation is associated with a first latency of response time for the vehicle, wherein a current operation of the vehicle is associated with a second latency of response time, and wherein the first latency is greater than the second latency.

10. The non-transitory machine-readable storage medium of claim 9, wherein the defined power consumption operation is an increased power consumption operation relative to a current power consumption operation.

11. The non-transitory machine-readable storage medium of claim 10, wherein the facilitating the modification of the enhanced discontinuous reception mode comprises facilitating a change to the increased power consumption operation at a time of the determination of the likelihood of usage.

12. The non-transitory machine-readable storage medium of claim 9, wherein the location comprises an airport.

13. The non-transitory machine-readable storage medium of claim 12, wherein the first portion comprises an arrival portion associated with the airport and the second portion comprises a parking portion associated with the airport.

14. The non-transitory machine-readable storage medium of claim 9, wherein the operations further comprise:
   determining that the mobile device is approaching the vehicle, and wherein the determination of the likelihood of usage is based on the determining that the vehicle is within a defined proximity of the mobile device.

15. The non-transitory machine-readable storage medium of claim 14, wherein the determination of the likelihood of usage is further based on determining that the mobile device is moving toward the vehicle.

16. An apparatus, comprising:
   a processor; and
   a memory that stores executable instructions that, when executed by the processor, facilitate performance of operations, comprising:
      determining that a first device is within a first portion of a location and a second device is in a second portion of the location;
      identifying that the second device is operating in an enhanced discontinuous reception mode of a wireless communication technology; and
      based on the determining and the identifying, facilitating modification of the enhanced discontinuous reception mode of the second device based on a determination of a likelihood of usage of a defined power consumption operation by the second device, wherein the defined power consumption operation is associated with a first latency of response time for the vehicle, wherein a current operation of the vehicle is associated with a second latency of response time, and wherein the first latency is greater than the second latency.

17. The apparatus of claim 16, wherein the facilitating the modification of the enhanced discontinuous reception mode comprises facilitating an increase to the defined power consumption operation at a time of the determination of the likelihood of usage.

18. The apparatus of claim 16, wherein the operations further comprise:
   determining that the first device is approaching the second device, wherein the determination of the likelihood of usage is based on the determining that the first device is within the defined proximity of the second device and based on determining that the first device is moving toward the second device.

19. The apparatus of claim 16, wherein the location comprises an airport.

* * * * *